(12) United States Patent
Ayai et al.

(10) Patent No.: US 9,722,508 B2
(45) Date of Patent: Aug. 1, 2017

(54) POWER CONVERSION DEVICE AND THREE-PHASE ALTERNATING CURRENT POWER SUPPLY DEVICE

(71) Applicant: Sumitomo Electric Industries, Ltd., Osaka-shi (JP)

(72) Inventors: Naoki Ayai, Osaka (JP); Koichi Takeshita, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/109,080

(22) PCT Filed: Jan. 6, 2015

(86) PCT No.: PCT/JP2015/050080
§ 371 (c)(1),
(2) Date: Jun. 29, 2016

(87) PCT Pub. No.: WO2015/105081
PCT Pub. Date: Jul. 16, 2015

(65) Prior Publication Data
US 2016/0329829 A1 Nov. 10, 2016

(30) Foreign Application Priority Data
Jan. 9, 2014 (JP) .................. 2014-002746

(51) Int. Cl.
*H02M 7/44* (2006.01)
*H02J 3/38* (2006.01)
(Continued)

(52) U.S. Cl.
CPC .............. *H02M 7/44* (2013.01); *H02J 3/383* (2013.01); *H02M 1/08* (2013.01); *H02M 1/126* (2013.01);
(Continued)

(58) Field of Classification Search
CPC ................ H02M 7/44; H02M 7/5387; H02M 3/156–3/158; H02M 1/08; H02M 1/126;
(Continued)

(56) References Cited

U.S. PATENT DOCUMENTS

2011/0080147 A1  4/2011  Schoenlinner et al.
2012/0201064 A1  8/2012  Asakura et al.

FOREIGN PATENT DOCUMENTS

JP   2000-152661 A   5/2000
JP   2011-078306 A   4/2011
(Continued)

OTHER PUBLICATIONS

International Search Report in PCT International Application No. PCT/JP2015/050080, dated Mar. 31, 2015.

*Primary Examiner* — Yemane Mehari
(74) *Attorney, Agent, or Firm* — Venable LLP; Michael A. Sartori; F. Brock Riggs

(57) ABSTRACT

Provided is a power conversion device that converts power between DC units and three-phase AC. A first-phase conversion device, a second-phase conversion device, and a third-phase conversion device each include a DC/DC conversion circuit and a single-phase power conversion circuit. For each of the first-phase conversion device, the second-phase conversion device, and the third-phase conversion device, when an absolute value of a voltage target value for the AC exceeds DC voltage of each DC unit, a control unit causes the DC/DC conversion circuit to operate to achieve the absolute value of the voltage target value and causes the single-phase power conversion circuit to only perform necessary polarity inversion, and when the absolute value of the voltage target value is smaller than the DC voltage, the control unit stops operation of the DC/DC conversion circuit
(Continued)

and causes the single-phase power conversion circuit to operate to achieve the voltage target value.

19 Claims, 24 Drawing Sheets

(51) Int. Cl.
*H02M 3/158* (2006.01)
*H02M 7/5387* (2007.01)
*H02M 1/08* (2006.01)
*H02M 1/12* (2006.01)
*H02M 1/00* (2006.01)

(52) U.S. Cl.
CPC ......... *H02M 3/158* (2013.01); *H02M 7/5387* (2013.01); *H02M 2001/007* (2013.01); *H02M 2001/0009* (2013.01); *Y02E 10/563* (2013.01)

(58) Field of Classification Search
CPC ..... H02M 2001/007; H02M 2001/0009; H02J 3/383; Y02E 10/563
USPC ...................................... 363/40–51
See application file for complete search history.

(56) References Cited

FOREIGN PATENT DOCUMENTS

| JP | 2012-137830 A | 7/2012 |
|----|---------------|--------|
| JP | 2012-165499 A | 8/2012 |

POWER CONVERSION DEVICE AND THREE-PHASE ALTERNATING CURRENT POWER SUPPLY DEVICE

TECHNICAL FIELD

The present invention relates to a three-phase AC power supply device that generates AC power from DC power and performs system interconnection with a three-phase AC system, and to a power conversion device used for the three-phase AC power supply device. The present invention also relates to a power conversion device for the opposite direction (from three-phase AC system to DC).

BACKGROUND ART

For example, power generated as DC current by a photovoltaic panel can be system-interconnected with a commercial AC system via a power conditioner which is a power conversion device. The system interconnection can be performed for not only a single-phase AC system but also a three-phase AC system (for example, see Patent Literature 1 (FIG. 2)).

FIG. 24 is an example of a circuit diagram of a power conversion device used in a case of performing system interconnection from a DC power supply to a three-phase AC system. In FIG. 24, a power conversion device 200 generates AC power based on DC power received from a photovoltaic panel 201 as a DC power supply, and supplies the power to a three-phase AC system 220. The power conversion device 200 includes a capacitor 202, a step-up circuit 203, a smoothing circuit 205 for smoothing the voltage of a DC bus 204, a three-phase inverter circuit 207, and three pairs of AC reactors 208 to 210 and capacitors 211 to 213. The smoothing circuit 205 is formed by connecting two capacitors 206 in series for the purpose of obtaining the withstand voltage property and connecting six sets of such two capacitors 206 in parallel for the purpose of obtaining the capacitance. The capacitance of the smoothing circuit as a whole is several mF, for example.

In this example, the photovoltaic panels 201, the capacitors 202, and the step-up circuits 203 are provided for three systems, and these systems are connected in parallel to the DC bus 204. For example, if input voltage from one photovoltaic panel 201 is DC 200V and the current thereof is 30 A, power of 6 kW per system and power of 18 kW in total can be generated. The line-to-line voltage of the three-phase AC system 220 is 400V.

For the output of the photovoltaic panel 201, the step-up circuit 203 performs maximum power point tracking (MPPT) control to obtain an optimum operating point. The output of the step-up circuit 203 is smoothed by the smoothing circuit 205 having a large capacitance, to become the voltage of the DC bus 204. This voltage is subjected to switching by the three-phase inverter circuit 207, thereby generating three-phase AC voltage including a high-frequency component. The high-frequency component is removed by the AC reactors 208 to 210 and the capacitors 211 to 213, whereby a waveform that allows system interconnection with the three-phase AC system 220 is obtained.

Here, the voltage of the DC bus 204 is required to be equal to or higher than the wave crest value of AC 400V, which is 400×√2, i.e., about 566V, but is set at 600V, considering some margin. In a case where the voltage of the DC bus 204 is 600V, when a switching element in the three-phase inverter circuit 207 is turned off, due to resonance by a floating inductance and the capacitance of the switching element, voltage that greatly exceeds 600V is applied to the switching element. Therefore, in order to reliably prevent insulation breakdown of the switching element, for example, withstand voltage property of 1200V which is twice as high as the voltage of the DC bus is required. In addition, the withstand voltage property of 1200V is also required for the smoothing circuit 205, and in the configuration in FIG. 24, withstand voltage property of 600V is required for each capacitor.

CITATION LIST

Patent Literature

PATENT LITERATURE 1: Japanese Laid-Open Patent Publication No. 2012-137830

SUMMARY OF INVENTION

Technical Problem

In the conventional power conversion device as described above, further improvement in the conversion efficiency is required. In order to improve the conversion efficiency, it is effective to reduce switching loss. In general, the higher the voltage of the DC bus is, the greater the switching loss and the like are. Therefore, how to reduce the voltage of the DC bus is a problem. In addition, it is desired to reduce the switching loss and other power losses also by means other than the reduction in the voltage.

In view of the above problems, a main object of the present invention is to reduce power loss due to conversion in a power conversion device provided between DC and three-phase AC.

Solution to Problem

The present invention is a power conversion device that converts power between a DC unit and a three-phase AC, the power conversion device including: a first-phase conversion device configured to covert power between the DC unit and a first phase of the three-phase AC, via a first reactor; a second-phase conversion device configured to covert power between the DC unit and a second phase of the three-phase AC, via a second reactor; a third-phase conversion device configured to covert power between the DC unit and a third phase of the three-phase AC, via a third reactor; and a control unit configured to control the first-phase conversion device, the second-phase conversion device, and the third-phase conversion device. The first-phase conversion device, the second-phase conversion device, and the third-phase conversion device each include a DC/DC conversion circuit and a single-phase power conversion circuit. For each of the first-phase conversion device, the second-phase conversion device, and the third-phase conversion device, when an absolute value of a voltage target value for the AC exceeds DC voltage of each DC unit, the control unit causes the DC/DC conversion circuit to operate to achieve the absolute value of the voltage target value and causes the single-phase power conversion circuit to only perform necessary polarity inversion, and when the absolute value of the voltage target value is smaller than the DC voltage, the control unit stops operation of the DC/DC conversion circuit and causes the single-phase power conversion circuit to operate to achieve the voltage target value.

In another aspect, the present invention is a three-phase AC power supply device including: a DC power supply; a first-phase conversion device configured to supply AC power via a first reactor to a first phase of the three-phase AC, based on DC power inputted from the DC power supply; a second-phase conversion device configured to supply AC power via a second reactor to a second phase of the three-phase AC, based on DC power inputted from the DC power supply; a third-phase conversion device configured to supply AC power via a third reactor to a third phase of the three-phase AC, based on DC power inputted from the DC power supply; and a control unit configured to control the first-phase conversion device, the second-phase conversion device, and the third-phase conversion device. The first-phase conversion device, the second-phase conversion device, and the third-phase conversion device each include a DC/DC conversion circuit and a single-phase power conversion circuit. For each of the first-phase conversion device, the second-phase conversion device, and the third-phase conversion device, when an absolute value of a voltage target value for the AC to be outputted exceeds inputted DC voltage, the control unit causes the DC/DC conversion circuit to operate to generate the absolute value of the voltage target value and causes the single-phase power conversion circuit to only perform necessary polarity inversion, and when the absolute value of the voltage target value is smaller than the inputted DC voltage, the control unit stops operation of the DC/DC conversion circuit and causes the single-phase power conversion circuit to operate to generate the voltage target value.

Advantageous Effects of Invention

The power conversion device and the three-phase AC power supply device of the present invention enable reduction in power loss due to conversion.

DESCRIPTION OF EMBODIMENTS

Summary of Embodiments

Figure 1:
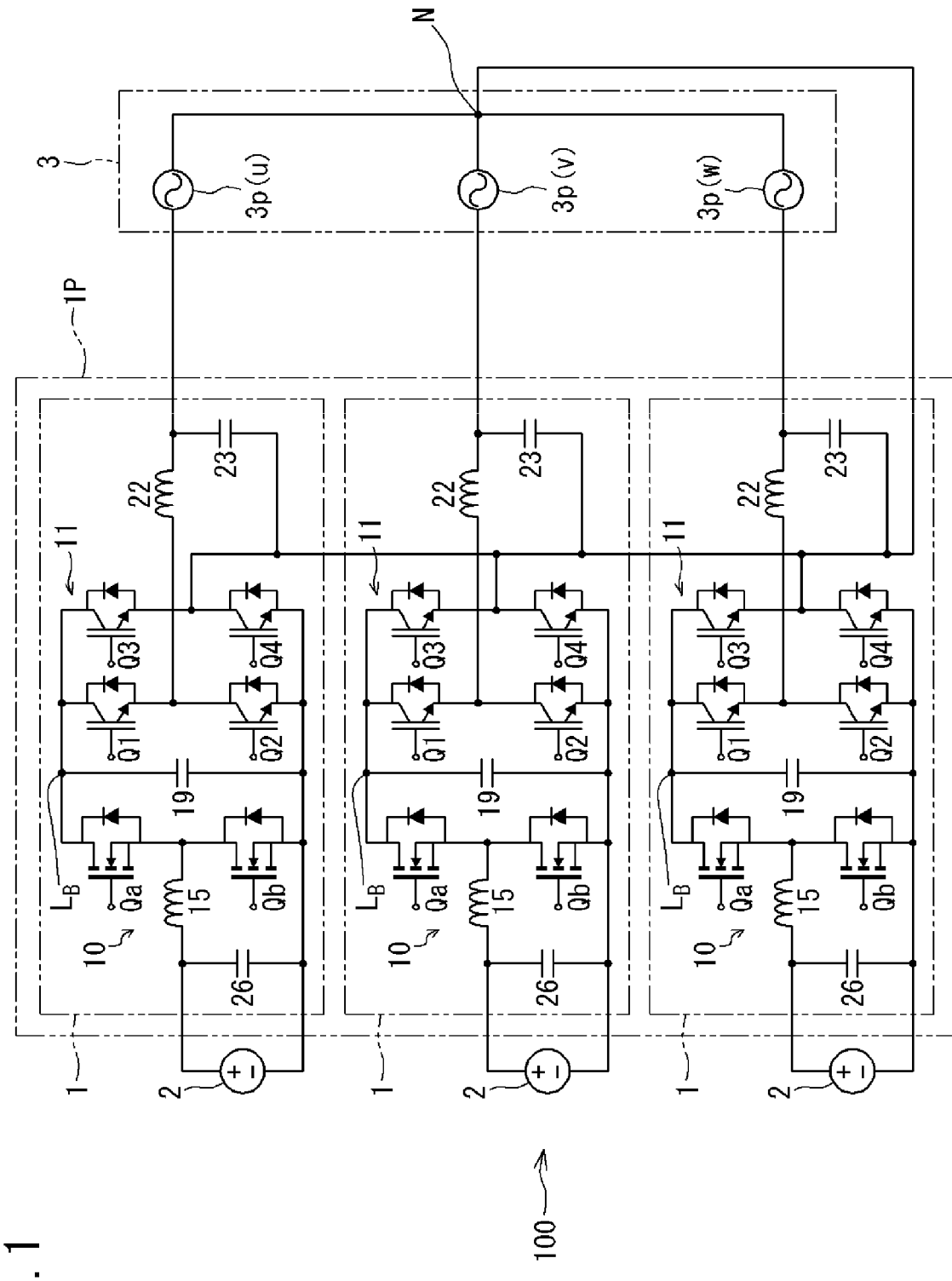
FIG. 1 is a circuit diagram showing a three-phase AC power supply device connected to a three-phase AC system.

Summary of the embodiments of the present invention includes at least the following.

(1) This is a power conversion device that converts power between a DC unit and a three-phase AC, the power conversion device including: a first-phase conversion device configured to covert power between the DC unit and a first phase of the three-phase AC, via a first reactor; a second-phase conversion device configured to covert power between the DC unit and a second phase of the three-phase AC, via a second reactor; a third-phase conversion device configured to covert power between the DC unit and a third phase of the three-phase AC, via a third reactor; and a control unit configured to control the first-phase conversion device, the second-phase conversion device, and the third-phase conversion device. The first-phase conversion device, the second-phase conversion device, and the third-phase conversion device each include a DC/DC conversion circuit and a single-phase power conversion circuit. For each of the first-phase conversion device, the second-phase conversion device, and the third-phase conversion device, when an absolute value of a voltage target value for the AC exceeds DC voltage of each DC unit, the control unit causes the DC/DC conversion circuit to operate to achieve the absolute value of the voltage target value and causes the single-phase power conversion circuit to only perform necessary polarity inversion, and when the absolute value of the voltage target value is smaller than the DC voltage, the control unit stops operation of the DC/DC conversion circuit and causes the single-phase power conversion circuit to operate to achieve the voltage target value.

In the power conversion device configured as described above, in a case where the (first, second, third) conversion devices are provided for the respective phases and, for example, configured to output phase voltages, the voltage $V_{AC}$ (effective value) that each conversion device should output is ($1/\sqrt{3}$) of the line-to-line voltage of the three-phase AC. Each conversion device performs the following operation.

(i) When the absolute value of the voltage target value exceeds inputted DC voltage, the DC/DC conversion circuit performs operation, and the single-phase power conversion circuit stops high-frequency switching and only performs necessary polarity inversion.

(ii) When the absolute value of the instantaneous value of the voltage target value is smaller than inputted DC voltage, the DC/DC conversion circuit is stopped (in FIG. 2, Qa is ON, Qb is OFF), and the single-phase power conversion circuit performs operation.

That is, the DC/DC conversion circuit and the single-phase power conversion circuit alternately perform high-frequency switching such that, when one of them performs high-frequency switching, the other one stops high-frequency switching. In this case, the peak value $V_B$ of voltage of the DC bus only needs to be the wave crest value of the voltage $V_{AC}$, i.e., $V_B = \sqrt{2} \cdot V_{AC}$.

As a result, the voltage of the DC bus is reduced as compared to a case of supplying voltage (line-to-line voltage) by a single three-phase inverter.

Voltage reduction in the DC bus provides the following advantages.

(a) Switching loss in the switching elements is reduced.

(b) Iron loss in the (DC, AC (first, second, third)) reactors is reduced.

(c) For the switching elements and the smoothing capacitor connected to the DC bus, even the ones having low withstand voltage properties can be used. Since a switching element having a lower withstand voltage property has a lower ON resistance, conduction loss can be reduced.

The alternate operations in the above (i) and (ii) provide the following advantages.

(d) The number of times the switching elements perform switching is reduced as a whole, and accordingly, switching loss is greatly reduced.

(e) Iron loss in the (DC, AC) reactors is reduced.

(f) The capacitor is not required to have a function of smoothing a low-frequency AC component that is three times as high as the system frequency, and therefore a capacitor with a low capacitance can be used.

(2) In the power conversion device of (1), preferably, an output smoothing capacitor is provided at each of stages subsequent to the first reactor, the second reactor, and the third reactor, and a smoothing capacitor is provided between the DC/DC conversion circuit and the single-phase power conversion circuit. Preferably, for each of the first-phase conversion device, the second-phase conversion device, and the third-phase conversion device, the control unit controls output of the AC power based on: an output current target value obtained based on a value of input power from the corresponding DC unit and a value of phase voltage of the three-phase AC; and a current target value for the corresponding DC/DC conversion circuit calculated from the following expression representing the current target value Iin* for the DC/DC conversion circuit:

$$Iin^* = \{(Iinv^* \times Vinv^*) + (sCVo^*) \times Vo^*\}/V_{DC},$$

a current target value Iinv* for the single-phase power conversion circuit being represented as follows:

$$Iinv^* = Ia^* + sCaVa,$$

where

Ia* is the output current target value,

Vinv* is a voltage target value for the single-phase power conversion circuit,

Ca is an electrostatic capacitance of the output smoothing capacitor,

Va is a voltage value of phase voltage of the three-phase AC,

C is an electrostatic capacitance of the smoothing capacitor provided between the DC/DC conversion circuit and the single-phase power conversion circuit, Vo* is a voltage target value for the DC/DC conversion circuit, $V_{DC}$ is a DC input voltage value, s is a Laplace operator.

In the case of the above (2), the control unit can control each conversion device to output AC power having a voltage phase leading the voltage phase of phase voltage of the three-phase AC system by several degrees.

That is, since the voltage phase of AC power outputted from each conversion device is caused to lead the voltage phase of the three-phase AC system by several degrees, the phase of voltage between both ends of each (first, second, third) reactor can be caused to lead the voltage phase of the three-phase AC system by almost 90 degrees. Since the current phase of each reactor lags the voltage phase thereof by 90 degrees, the current phase of AC power outputted through the reactor is almost synchronized with the phase of phase voltage of the three-phase AC system.

As a result, AC power having almost the same current phase as each phase voltage of the three-phase AC system can be outputted, whereby reduction in a power factor of the AC power can be suppressed.

(3) In the power conversion device of (2), preferably, the control unit calculates the voltage target value Vinv* for the single-phase power conversion circuit as the voltage target value for the DC/DC conversion circuit by the following expression:

$$Vinv^* = Va + sLaIinv^*,$$

where La is an inductance that is common among the first reactor, the second reactor, and the third reactor.

In this case, since both the DC/DC conversion circuit and the single-phase power conversion circuit operate based on the current target value Iinv* set by the control unit, occurrence of phase-deviation or distortion in AC current outputted from each conversion device can be suppressed even if operation is performed so as to alternately switch the high-frequency switching period between the two circuits.

(4) In the power conversion device of any one of (1) to (3), the DC unit may be composed of a first DC unit, a second DC unit, and a third DC unit provided for the first phase, the second phase, and the third phase, respectively, and these DC units may be independent of each other without sharing either positive terminals or negative terminals.

In this case, the electric specifications of the DC units may be different from each other. For example, three DC units having voltages different from each other can be used.

(5) In the power conversion device of any one of (1) to (3), the DC unit may be one unit that is common among the first phase, the second phase, and the third phase, and isolation transformers may be provided between: the first-phase conversion device, the second-phase conversion device, and the third-phase conversion device; and the respective phases of the three-phase AC.

In this case, since the DC units can be integrated into one unit, the capacity of the DC unit can be set to an appropriate value without waste.

(6) In the power conversion device of any one of (1) to (5), the power conversion device may be connected to the three-phase AC in either connection manner of three-phase four-line connection or three-phase three-line connection.

Thus, whether the three-phase AC system has a three-phase four-line configuration with a neutral point or a three-phase three-line configuration with no neutral point, the three-phase AC system can be connected to the power conversion device.

(7) In another aspect, this is a three-phase AC power supply device connected to a three-phase AC system and including: a DC power supply; a first-phase conversion device configured to supply AC power via a first reactor to a first phase of the three-phase AC system, based on DC power inputted from the DC power supply; a second-phase conversion device configured to supply AC power via a second reactor to a second phase of the three-phase AC system, based on DC power inputted from the DC power supply; a third-phase conversion device configured to supply AC power via a third reactor to a third phase of the three-phase AC system, based on DC power inputted from the DC power supply; and a control unit configured to control the first-phase conversion device, the second-phase conversion device, and the third-phase conversion device. The first-phase conversion device, the second-phase conversion device, and the third-phase conversion device each include a DC/DC conversion circuit and a single-phase power conversion circuit. For each of the first-phase conversion device, the second-phase conversion device, and the third-phase conversion device, when an absolute value of a voltage target value for the AC to be outputted exceeds inputted DC voltage, the control unit causes the DC/DC conversion circuit to operate to generate the absolute value of the voltage target value and causes the single-phase power conversion circuit to only perform necessary polarity inversion, and when the absolute value of the voltage target value is smaller than the inputted DC voltage, the control unit stops operation of the DC/DC conversion circuit and causes the single-phase power conversion circuit to operate to generate the voltage target value.

The above three-phase AC power supply device provides the same operational effect as that of the power conversion device of (1).

(8) In the three-phase AC power supply device of (7), the DC power supply may be composed of a first DC power supply, a second DC power supply, and a third DC power supply provided for the first phase, the second phase, and the third phase, respectively, and theses DC power supplies may be independent of each other without sharing either positive terminals or negative terminals.

This configuration is suitable for a case of making three-phase four-line connection (Y connection) between the power conversion device and the three-phase AC system.

(9) In the three-phase AC power supply device of (7), the DC power supply may be one power supply that is common among the first phase, the second phase, and the third phase, and isolation transformers may be provided between: the first-phase conversion device, the second-phase conversion device, and the third-phase conversion device; and the respective phases of the three-phase AC system.

This configuration is suitable for a case of making three-phase three-line connection (delta connection) between the power conversion device and the three-phase AC system.

(10) In the three-phase AC power supply device of any one of (7) to (9), the first-phase conversion device, the second-phase conversion device, and the third-phase conversion device may be connected to the three-phase AC system in either connection manner of three-phase four-line connection or three-phase three-line connection.

Thus, whether the three-phase AC system has a three-phase four-line configuration with a neutral point or a three-phase three-line configuration with no neutral point, the three-phase AC system can be connected to the first to third conversion devices.

(11) In the three-phase AC power supply device of any one of (7) to (10), each of the first DC power supply, the second DC power supply, and the third DC power supply may be a concentrator photovoltaic panel configured to operate so as to track the sun.

In this case, it is possible to perform comparatively stable power generation with high output during the day while suppressing power loss.

(12) The three-phase AC power supply device of (7) may be system-interconnected with the three-phase AC system.

(13) The three-phase AC power supply device of (7) may be configured to output three-phase AC.

Details of Embodiments

Hereinafter, embodiments of the present invention will be described in detail with reference to the drawings. In the present specification and the drawings, although a term of "command value" and a term of "target value" coexist, they are the same meaning as each other.

<<Configuration as Three-Phase AC Power Supply Device>>

FIG. 1 is a circuit diagram showing a three-phase AC power supply device 100 connected to a three-phase AC system 3. The three-phase AC power supply device 100 includes a power conversion device 1P, and, for example, three photovoltaic panels 2 as a DC power supply (first DC power supply, second DC power supply, third DC power supply). The three photovoltaic panels 2 are in such a relation as to be independent of each other without sharing either the positive terminals or the negative terminals.

The power conversion device 1P is composed of three conversion devices (first-phase conversion device, second-phase conversion device, third-phase conversion device) 1 provided for the respective phases of the three-phase AC. The conversion device 1 converts DC power inputted from the photovoltaic panel 2, to AC power, and supplies the AC power to the three-phase AC system 3. The three conversion devices 1 supply AC powers with the respective phase voltages, to the respective phases 3p (first phase u, second phase v, third phase w) with respect to a neutral point N of the three-phase AC system 3.

In a case where the line-to-line voltage of the three-phase AC system 3 is 400V, the phase voltage is about 231V (400V/√3). Each conversion device 1 that outputs the phase voltage requires about 327V ((400V√3/×√2) as the voltage of a DC bus $L_B$. This means that the voltage of the DC bus $L_B$ is reduced (566V→327V) as compared to a case where the line-to-line voltage (400V) of the three-phase AC system 3 is supplied by a single three-phase inverter. Therefore, the withstand voltage properties of switching elements and other electronic devices do not require 1200V but about 600V is sufficient.

Figure 2:
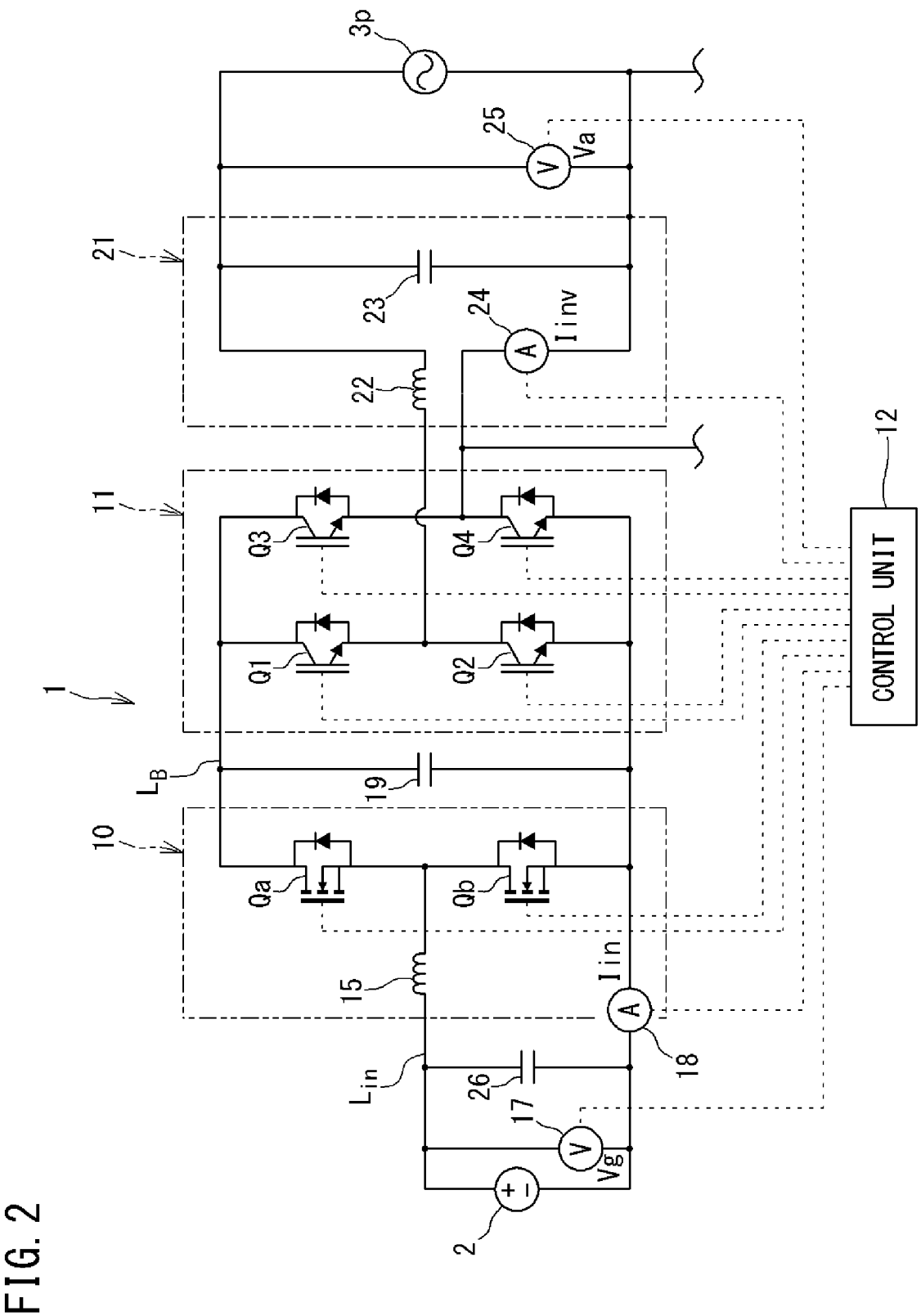
FIG. 2 is a diagram showing in more detail the internal circuit of one conversion device in FIG. 1.

FIG. 2 is a diagram showing in more detail the internal circuit of one conversion device 1 in FIG. 1. In FIG. 2, the photovoltaic panel 2 as a DC power supply is connected to the input end of the conversion device 1, and the system phase power supply 3p (the phase voltage of the three-phase AC) is connected to the output end of the conversion device 1. The conversion device 1 performs system interconnection operation to convert DC power generated by the photovoltaic panel 2 to AC power and output the AC power to the system phase power supply 3p.

The conversion device 1 includes: a step-up circuit (DC/DC conversion circuit) 10 which receives DC power outputted from the photovoltaic panel 2; and a single-phase inverter circuit (single-phase power conversion circuit) 11 which converts power given from the step-up circuit 10, to AC power, and outputs the AC power to the system phase power supply 3p. The step-up circuit 10 and the single-phase inverter circuit 11 are controlled by a control unit 12. The control unit 12 can control any of the three conversion devices 1.

The step-up circuit 10 includes a DC reactor 15, and switching elements Qa and Qb composed of, for example, FETs (Field Effect Transistors), to form a step-up chopper circuit. Instead of FETs, IGBTs (Insulated Gate Bipolar Transistors) may be used.

On an input side of the step-up circuit 10, a first voltage sensor 17, a first current sensor 18, and a capacitor 26 for smoothing are provided.

The first voltage sensor 17 detects a DC input voltage detection value Vg (DC input voltage value) of DC power outputted from the photovoltaic panel 2 and then inputted to the step-up circuit 10, and outputs the DC input voltage detection value Vg to the control unit 12. The first current sensor 18 detects a step-up circuit current detection value Iin (DC input current value) of current flowing in the DC reactor 15, and outputs the step-up circuit current detection value Iin to the control unit 12. In order to detect a DC input current detection value Ig, a current sensor may be further provided at a stage preceding the capacitor 26.

The control unit 12 has a function of calculating input power Pin from the DC input voltage detection value Vg and the step-up circuit current detection value Iin and performing maximum power point tracking (MPPT) control for the photovoltaic panel 2.

During step-up operation, the switching elements Qa and Qb of the step-up circuit 10 are alternately turned on by high-frequency PWM control. When the step-up operation is stopped, the switching element Qa is turned on and the switching element Qb is turned off. From the perspective as to whether the step-up circuit 10 is operating or is stopped, as described later, control is performed so that a period in which high-frequency switching operation is performed is alternately switched between the step-up circuit 10 and the single-phase inverter circuit 11. Therefore, during a period in which the step-up circuit 10 is performing switching operation, the step-up circuit 10 outputs power with stepped-up voltage to the single-phase inverter circuit 11, and during a period in which the switching operation is stopped, the step-up circuit 10 outputs, to the single-phase inverter circuit 11, DC power outputted from the photovoltaic panel 2 and then inputted to the step-up circuit 10, without stepping up the voltage of the DC power.

A capacitor 19 (smoothing capacitor) for smoothing is connected between the step-up circuit 10 and the single-phase inverter circuit 11.

The single-phase inverter circuit 11 includes switching elements Q1 to Q4 each composed of, for example, an IGBT. The switching elements Q1 to Q4 form a full-bridge circuit.

The switching elements Q1 to Q4 are connected to the control unit 12, and can be controlled by the control unit 12. The control unit 12 performs PWM control of operations of the switching elements Q1 to Q4. Thereby, the single-phase inverter circuit 11 converts power given from the step-up circuit 10 to AC power.

The conversion device 1 includes a filter circuit 21 between the single-phase inverter circuit 11 and the system phase power supply 3p.

The filter circuit 21 is composed of an AC reactor 22 and a capacitor 23 (output smoothing capacitor) provided at a stage subsequent to the AC reactor 22. The filter circuit 21 has a function to remove a high-frequency component contained in AC power outputted from the single-phase inverter circuit 11. The AC power from which the high-frequency component has been removed by the filter circuit 21 is given to the system phase power supply 3p.

Thus, the step-up circuit 10 and the single-phase inverter circuit 11 convert DC power outputted from the photovoltaic panel 2 to AC power and output the converted AC power to the system phase power supply 3p via the filter circuit 21.

A second current sensor 24 for detecting an inverter current detection value Iinv (current flowing in the AC reactor 22) which is a current value of output of the single-phase inverter circuit 11 is connected to the filter circuit 21. A second voltage sensor 25 for detecting a voltage value (system voltage detection value Va) on the system phase power supply 3p side is connected between the filter circuit 21 and the system phase power supply 3p.

The second current sensor 24 and the second voltage sensor 25 respectively output the detected inverter current detection value Iinv and the detected system voltage detection value Va (the voltage value of the AC system) to the control unit 12. Although the second current sensor 24 is provided at a stage preceding the capacitor 23 in FIG. 2, the second current sensor 24 may be provided at a stage subsequent to the capacitor 23.

The control unit 12 controls the step-up circuit 10 and the single-phase inverter circuit 11 based on the system voltage detection value Va, the inverter current detection value Iinv, the DC input voltage detection value Vg, and the step-up circuit current detection value Iin.

As described above, in the circuit configuration in FIG. 1, the voltage of the DC bus $L_B$ is reduced as compared to a case where the system voltage (line-to-line voltage) is supplied by a single three-phase inverter. Owing to voltage reduction in the DC bus $L_B$, switching loss in the switching elements Q1 to Q4 and Qa is reduced. In addition, iron loss in the reactors (DC reactor 15, AC reactor 22) in the conversion device 1 is reduced. Further, for the switching elements Q1 to Q4, Qa, and Qb and the smoothing capacitor 19 connected to the DC bus $L_B$, even the ones having low withstand voltage properties can be used. Since a switching element having a lower withstand voltage property has a lower ON resistance, conduction loss can be reduced.

<<Minimum Modulation Method in Power Conversion Device>>

Figure 14:
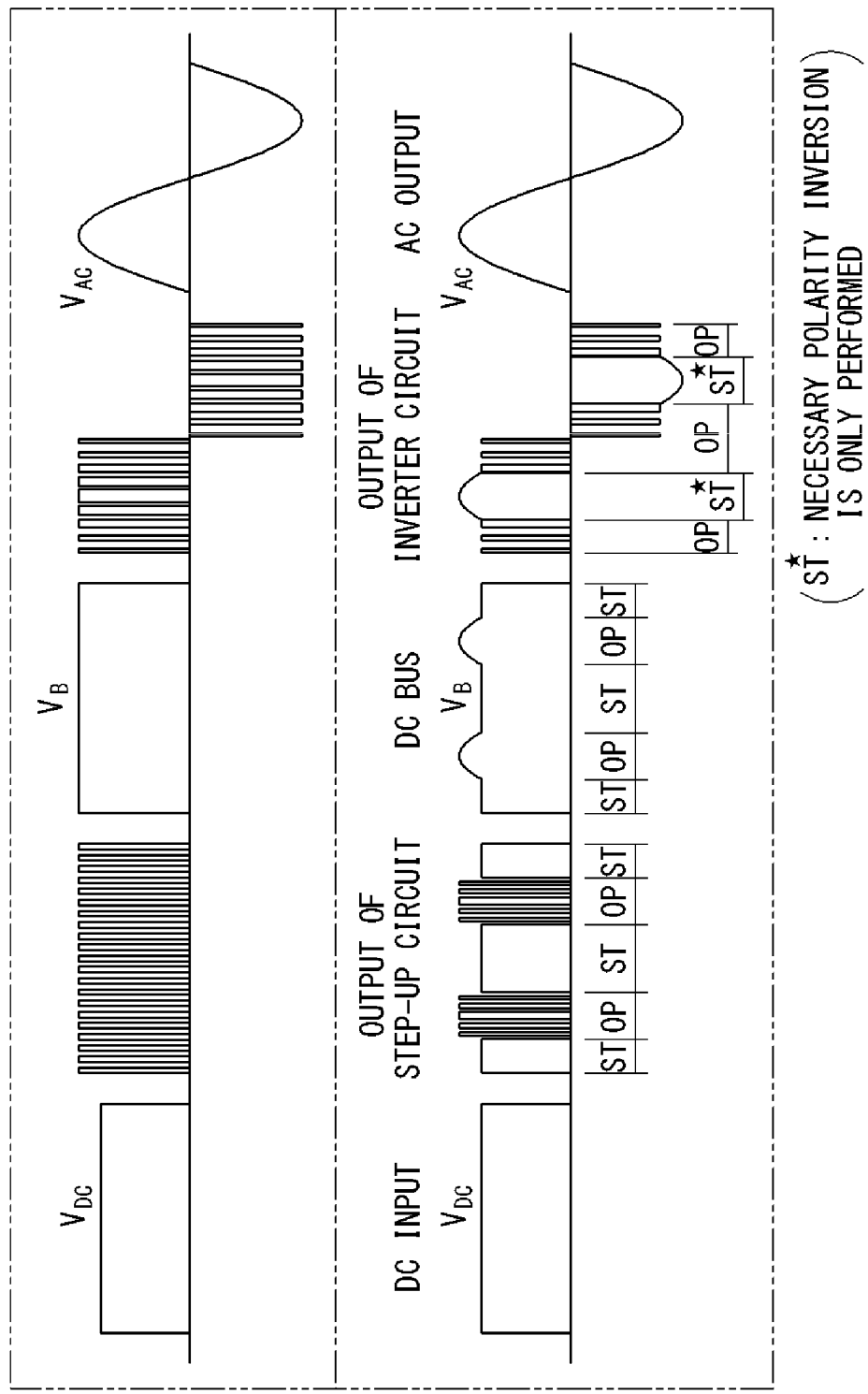
FIG. 14 is a waveform diagram schematically showing the feature of operation of the conversion device.
Figure 15:
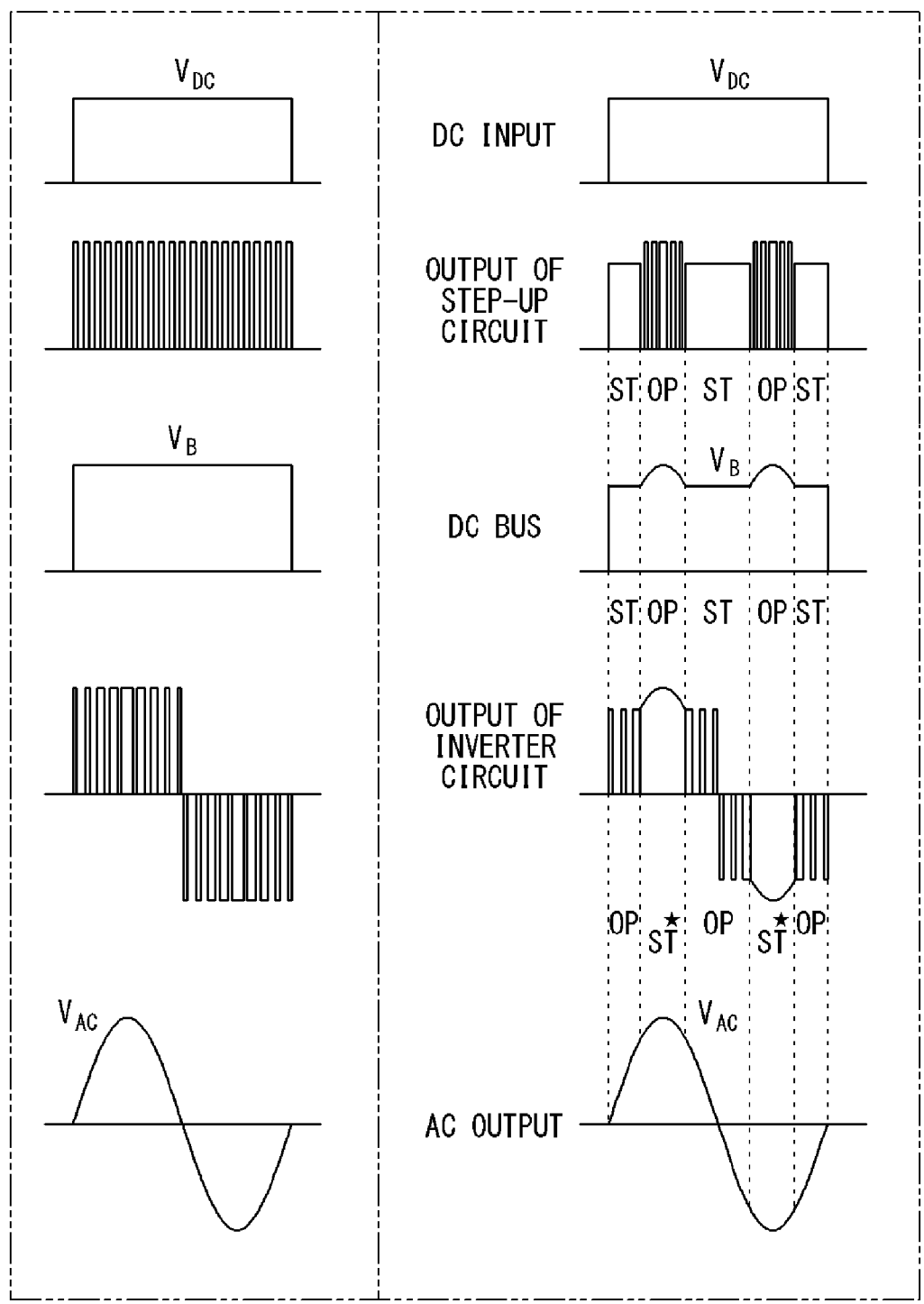
FIG. 15 is a waveform diagram schematically showing the feature of operation of the conversion device.

Next, FIG. 14 and FIG. 15 are waveform diagrams schematically showing the feature of operation of the conversion device 1. Both figures show the same content, in which FIG. 14 particularly shows the relationship of amplitudes from DC input to AC output in a visible manner, and FIG. 15 particularly shows timings of control in a visible manner. The upper stage in FIG. 14 and the left column in FIG. 15 show waveform diagrams indicating operation of a conventional conversion device which does not use the minimum modulation method, for comparison. The lower stage in FIG. 14 and the right column in FIG. 15 show waveform diagrams indicating operation of the conversion device 1 (FIG. 2) using the minimum modulation method.

First, in the upper stage in FIG. 14 (or the left column in FIG. 15), in the conventional conversion device, output (in FIG. 2, voltage arising at the mutual connection point among the switching elements Qa and Qb and the DC reactor 15) of the step-up circuit in response to DC input, i.e., the DC voltage $V_{DC}$, is a pulse train having a higher value than $V_{DC}$ and arranged at regular intervals. This output is smoothed to arise as the voltage $V_B$ on the DC bus $L_B$. On the other hand, the single-phase inverter circuit performs switching under PWM control while inverting the polarity per half cycle. As a result, sinusoidal AC voltage $V_{AC}$ as AC output is obtained via smoothing by the filter circuit.

Next, in the minimum modulation method at the lower stage in FIG. 14, the step-up circuit 10 and the single-phase inverter circuit 11 in FIG. 2 operate in accordance with a result of comparison between the absolute value of the voltage target value $V_{AC}$ having an AC waveform, and the DC voltage $V_{DC}$ which is the input. That is, when the absolute value of the voltage target value satisfies $V_{AC} < V_{DC}$ (or $V_{AC} \leq V_{DC}$), the step-up circuit 10 is stopped ("ST" in the drawing), and when the absolute value of the voltage target value satisfies $V_{AC} \geq V_{DC}$ (or $V_{AC} > V_{DC}$), the step-up circuit 10 performs step-up operation ("OP" in the drawing). The output of the step-up circuit 10 is smoothed by the capacitor 19 (FIG. 2) to arise as the shown voltage $V_B$ on the DC bus $L_B$.

On the other hand, as for the single-phase inverter circuit 11, in accordance with a result of comparison between the absolute value of the voltage target value $V_{AC}$ and the DC voltage $V_{DC}$, when $V_{AC} < V_{DC}$ (or $V_{AC} \leq V_{DC}$) is satisfied, high-frequency switching is performed ("OP" in the drawing), and when $V_{AC} \geq V_{DC}$ (or $V_{AC} > V_{DC}$) is satisfied, the high-frequency switching is stopped ("ST" in the drawing). When the single-phase inverter circuit 11 stops high-frequency switching, the single-phase inverter circuit 11 selects either the state in which the switching elements Q1 and Q4 are ON and the switching elements Q2 and Q3 are OFF, or the state in which the switching elements Q1 and Q4 are OFF and the switching elements Q2 and Q3 are ON, thereby only performing necessary polarity inversion. The output of the single-phase inverter circuit 11 is smoothed by the filter circuit 21, whereby desired AC output is obtained.

Here, as shown in the right column in FIG. 15, the step-up circuit 10 and the single-phase inverter circuit 11 alternately perform high-frequency switching. When the step-up circuit 10 performs step-up operation, the single-phase inverter circuit 11 stops high-frequency switching and only performs necessary polarity inversion for the voltage of the DC bus $L_B$. On the other hand, when the single-phase inverter circuit 11 performs high-frequency switching operation, the step-up circuit 10 is stopped, to allow the voltage on an electric path $L_{in}$ (FIG. 2) to pass as it is.

By the step-up circuit 10 and the single-phase inverter circuit 11 alternately performing high-frequency switching operation as described above, the number of times the switching elements Q1 to Q4, Qa, and Qb perform switching is reduced as a whole, and accordingly, the switching loss is greatly reduced. While the frequency of the high-frequency switching is, for example, 20 kHz, the frequency of switching in the polarity inversion by the single-phase inverter circuit 11 is 100 Hz or 120 Hz, which is twice as high as the commercial frequency. That is, the frequency of the polarity inversion is very low as compared to the frequency of the high-frequency switching, and therefore the switching loss is also small.

In addition, by the step-up circuit 10 and the single-phase inverter circuit 11 alternately performing high-frequency switching operation, iron loss in the reactors (DC reactor 15, AC reactor 22) is reduced.

Further, the capacitor 19 only needs to smooth the high-frequency of the switching. Therefore, the capacitor 19 does not need to have a function of smoothing a low-frequency AC component that is three times as high as the system frequency. Therefore, a capacitor having a low capacitance (for example, 10 µF or 22 µF) can be used.

Figure 16:
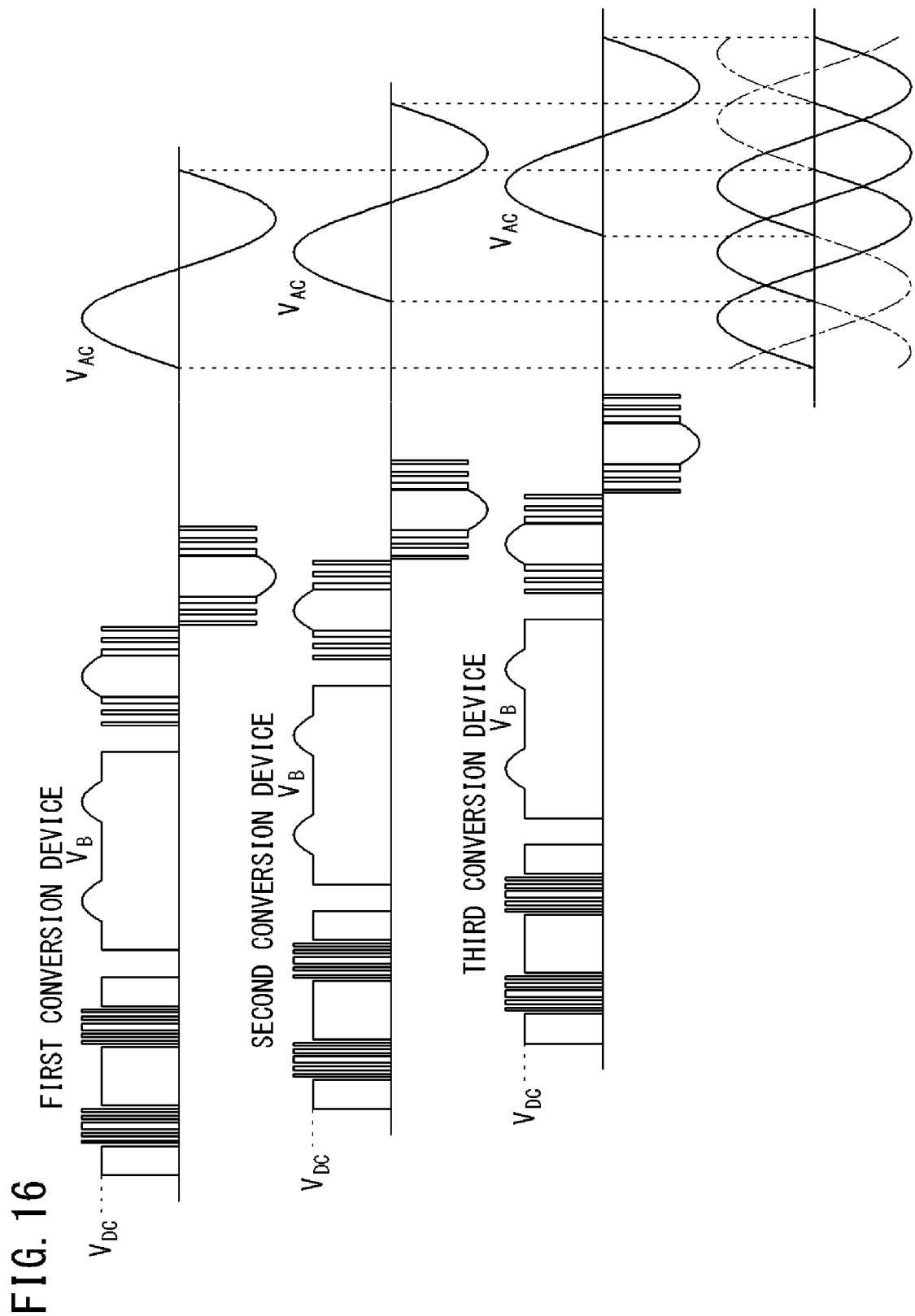
FIG. 16 is a diagram showing the manner of generation of three-phase AC voltage.

FIG. 16 is a diagram showing the manner of generation of the three-phase AC voltage. The three conversion devices 1 are referred to as a first-phase conversion device, a second-phase conversion device, and a third-phase conversion device. The control unit 12 performs control so that the phases of outputs of these conversion devices are shifted from each other by (⅔)π. Thus, three-phase AC voltage as shown in FIG. 16 which is the same as in the three-phase AC system can be outputted.

<<System Interconnection of Power Conversion Device>>

Hereinafter, system interconnection of the power conversion device 1P will be described in detail.

In order to perform system interconnection, it is necessary to control the phases of outputted currents so that the conversion devices 1 for the respective phases convey powers at a power factor of 1 to the three-phase AC system 3. That is, it is necessary to not only output voltage having a phase coinciding with the voltage phase of each system phase power supply 3p, but also cause the voltage phase of each system phase power supply 3p to coincide with the phase of current outputted from the corresponding conversion device 1.

[1.1 Control Unit]

Figure 3:
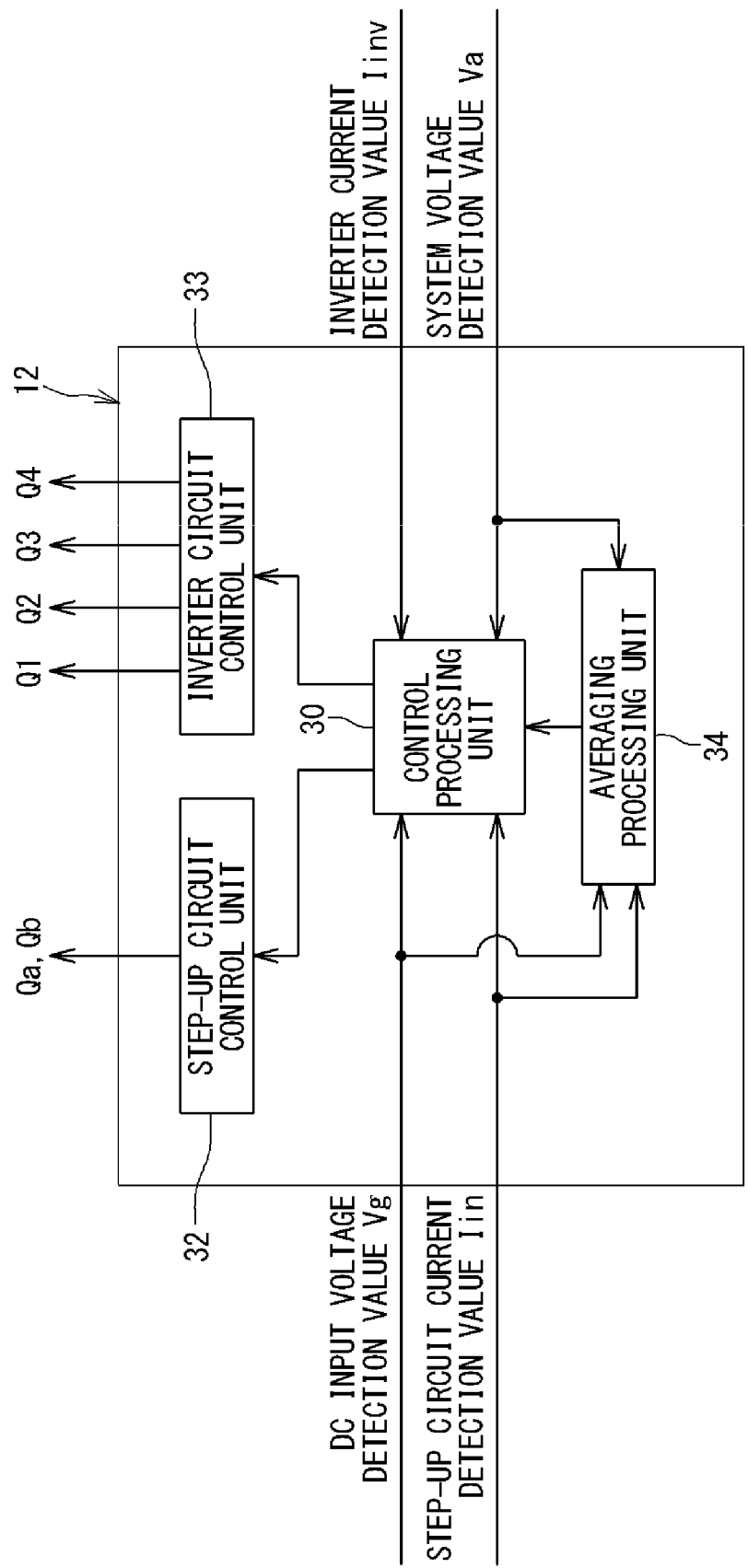
FIG. 3 is a block diagram of a control unit.

FIG. 3 is a block diagram of the control unit 12. As shown in FIG. 3, the control unit 12 functionally has a control processing unit 30, a step-up circuit control unit 32, an inverter circuit control unit 33, and an averaging processing unit 34.

Some or all of the functions of the control unit 12 may be configured as a hardware circuit, or may be realized by software (computer program) executed by a computer. Such software (computer program) for realizing a function of the control unit 12 is stored in a storage device (not shown) of the computer.

The step-up circuit control unit 32 controls the switching elements Qa and Qb of the step-up circuit 10 based on a command value and a detection value given from the control processing unit 30, thereby causing the step-up circuit 10 to output power having current corresponding to the command value.

The inverter circuit control unit 33 controls the switching elements Q1 to Q4 of the single-phase inverter circuit 11 based on a command value and a detection value given from the control processing unit 30, thereby causing the single-phase inverter circuit 11 to output power having current corresponding to the command value.

The control processing unit 30 receives the DC input voltage detection value Vg, the step-up circuit current detection value Iin, the system voltage detection value Va, and the inverter current detection value Iinv.

The control processing unit 30 calculates the input power Pin and an average value <Pin> thereof from the DC input voltage detection value Vg and the step-up circuit current detection value Iin.

The control processing unit 30 has a function to set a DC input current command value Ig* (which will be described later) based on the input power average value <Pin> and perform MPPT control for the photovoltaic panel 2, and to perform feedback control for the step-up circuit 10 and the single-phase inverter circuit 11.

The DC input voltage detection value Vg and the step-up circuit current detection value Iin are given to the averaging processing unit 34 and the control processing unit 30.

The averaging processing unit 34 has a function to sample, at predetermined time intervals, the DC input voltage detection value Vg and the step-up circuit current detection value Iin given from the first voltage sensor 17 and the first current sensor 18, calculate their respective average values, and give the averaged DC input voltage detection value Vg and the averaged step-up circuit current detection value Iin to the control processing unit 30.

Figure 4:
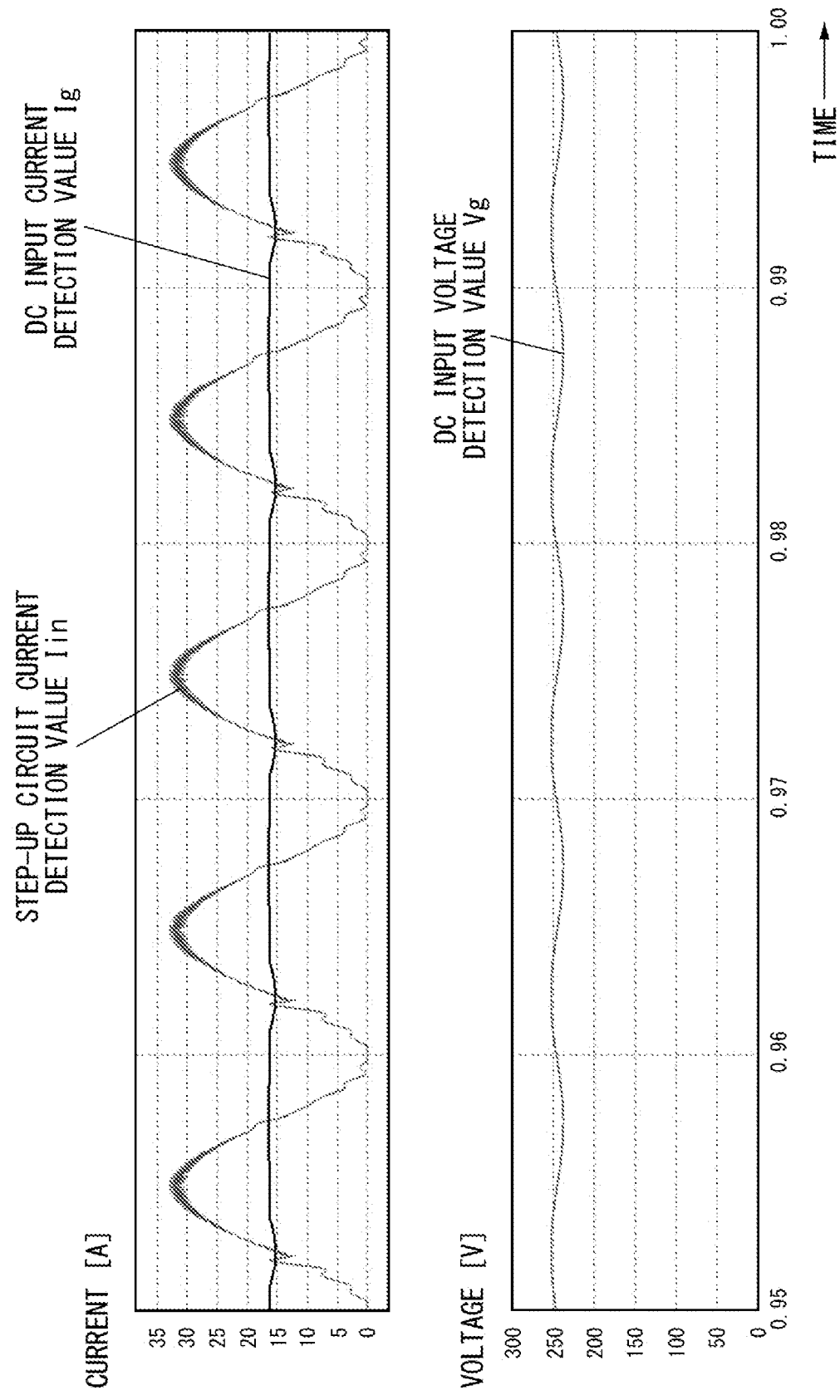
FIG. 4 is graphs showing an example of a simulation result of temporal variations in a DC input voltage detection value and a step-up circuit current detection value.

FIG. 4 is graphs showing an example of a simulation result of temporal changes in the DC input voltage detection value Vg and the step-up circuit current detection value Iin.

The DC input current detection value Ig is a current value detected on an input side relative to the capacitor 26.

As shown in FIG. 4, it is found that the DC input voltage detection value Vg, the step-up circuit current detection value Iin, and the DC input current detection value Ig vary in a half cycle of the system voltage.

The reason why the DC input voltage detection value Vg and the DC input current detection value Ig vary periodically as shown in FIG. 4 is as follows. That is, the step-up circuit current detection value Iin greatly varies between almost 0A and a peak value in a half cycle of the AC cycle in accordance with operations of the step-up circuit 10 and the single-phase inverter circuit 11. Therefore, the variation component cannot be fully removed by the capacitor 26, and the DC input current detection value Ig is detected as pulsating current containing a component that varies in a half cycle of the AC cycle. On the other hand, output voltage of the photovoltaic panel varies depending on output current.

Therefore, the cycle of the periodic variation occurring in the DC input voltage detection value Vg is half the cycle of AC power outputted from the conversion device 1.

The averaging processing unit 34 averages the DC input voltage detection value Vg and the step-up circuit current detection value Iin in order to suppress an influence of the above periodic variations.

Figure 5:
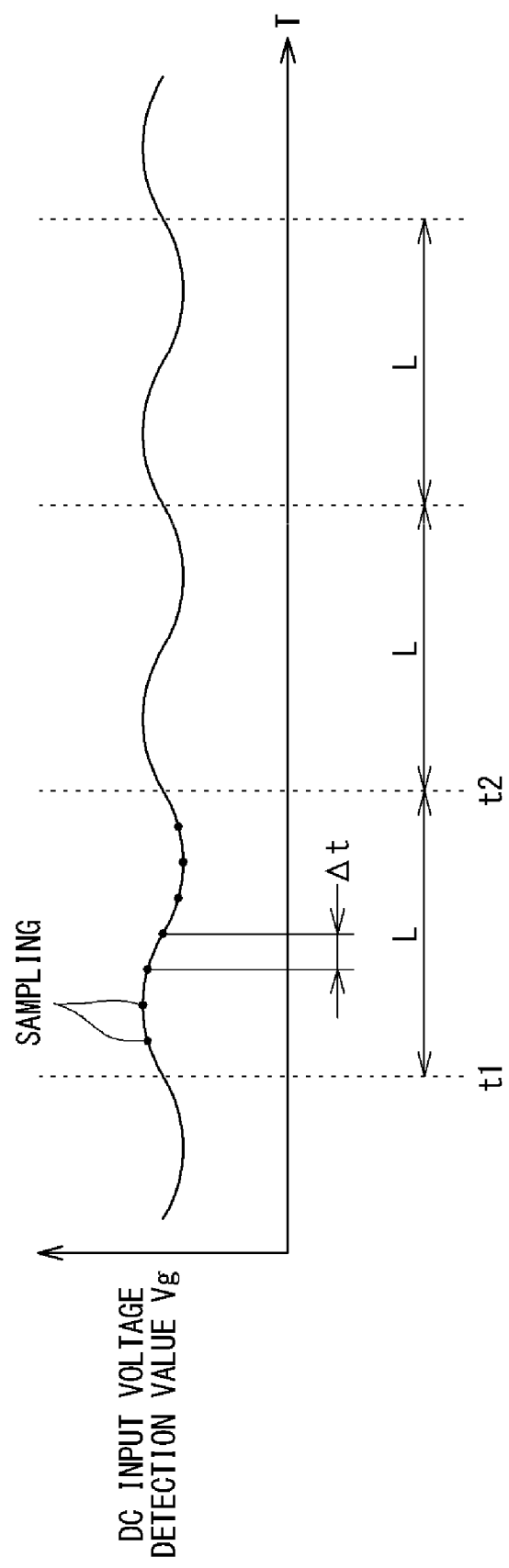
FIG. 5 is a diagram showing a manner in which an averaging processing unit averages a DC input voltage detection value.

FIG. 5 is a diagram showing a manner in which the averaging processing unit 34 averages the DC input voltage detection value Vg.

The averaging processing unit 34 samples the given DC input voltage detection value Vg a plurality of times (at timings indicated by solid dots in FIG. 5) at predetermined time intervals Δt during a period L from a timing t1 to a timing t2, and calculates an average value of the plurality of DC input voltage detection values Vg that have been obtained.

Here, the averaging processing unit 34 sets the period L to half the length of the cycle of the system phase power supply 3p. In addition, the averaging processing unit 34 sets the time interval Δt to be sufficiently shorter than half the length of the cycle of the system phase power supply 3p.

Thus, the averaging processing unit 34 can accurately obtain the average value of the DC input voltage detection value Vg which periodically varies in synchronization with the cycle of the system phase power supply 3p, using as short a sampling period as possible.

The time interval Δt of sampling may be set at, for example, 1/100 to 1/1000 of the cycle of the system phase power supply 3p, or 20 microseconds to 200 microseconds.

The averaging processing unit 34 may store the period L in advance, or may acquire the system voltage detection value Va from the second voltage sensor 25 and set the period L based on the cycle of the system phase power supply 3p.

Here, the period L is set to half the length of the cycle of the system phase power supply 3p. The average value of the DC input voltage detection value Vg can be accurately calculated at least if the period L is set to half the cycle of the system phase power supply 3p. This is because the DC input voltage detection value Vg periodically varies in a half cycle of the system phase power supply 3p in accordance with operations of the step-up circuit 10 and the single-phase inverter circuit 11 as described above.

Therefore, if it is required to set the period L to be longer, the period L may be set to an integer multiple of a half cycle of the system phase power supply 3p, e.g., three or four times of a half cycle of the system phase power supply 3p. Thus, the voltage variation can be grasped on a cycle basis.

As described above, the step-up circuit current detection value Iin also periodically varies in a half cycle of the system phase power supply 3p, as in the DC input voltage detection value Vg.

Therefore, the averaging processing unit 34 also calculates an average value of the step-up circuit current detection value Iin by the same method as in the DC input voltage detection value Vg shown in FIG. 5.

The control processing unit 30 sequentially calculates an average value of the DC input voltage detection value Vg and an average value of the step-up circuit current detection value Iin per the period L.

The averaging processing unit 34 gives the calculated average value of the DC input voltage detection value Vg and the calculated average value of the step-up circuit current detection value Iin to the control processing unit 30.

In the present example, as described above, the averaging processing unit 34 calculates an average value (DC input voltage average value <Vg>) of the DC input voltage detection value Vg and an average value (step-up circuit current average value <Iin>) of the step-up circuit current detection value Iin, and using these values, the control processing unit 30 controls the step-up circuit 10 and the single-phase inverter circuit 11 while performing MPPT control for the photovoltaic panel 2. Therefore, even if DC current from the photovoltaic panel 2 varies to be unstable, the control unit 12 can accurately obtain output of the photovoltaic panel 2 as the DC input voltage average value <Vg> and the step-up circuit current average value <Iin> in which a variation component due to operation of the conversion device 1 has been removed. As a result, it becomes possible to appropriately perform MPPT control and effectively suppress reduction in power generation efficiency of the photovoltaic panel 2.

As described above, in a case where voltage (DC input voltage detection value Vg) or current (step-up circuit current detection value Iin) of DC power outputted from the photovoltaic panel 2 varies due to operation of the conversion device 1, the cycle of the variation almost coincides with a half cycle (a half cycle of the system phase power supply 3p) of AC power outputted from the single-phase inverter circuit 11.

In this regard, in the present example, the DC input voltage detection value Vg and the step-up circuit current detection value Iin are each sampled a plurality of times at the time intervals Δt which are shorter than a half cycle of the AC system, during the period L which is set to half the length of the cycle of the system phase power supply 3p, and the DC input voltage average value <Vg> and the step-up circuit current average value <Iin> are calculated from a result of the sampling. Therefore, even if voltage and current of the DC current vary periodically, the DC input voltage average value <Vg> and the step-up circuit current average value <Iin> can be accurately calculated, with the sampling period shortened as much as possible.

The control processing unit 30 sets the DC input current command value Ig* based on the above input power average value <Pin>, and calculates respective command values for the step-up circuit 10 and the single-phase inverter circuit 11 based on the set DC input current command value Ig* and the above values.

The control processing unit 30 has a function of giving the calculated command values to the step-up circuit control unit 32 and the inverter circuit control unit 33 and performing feedback control for the step-up circuit 10 and the single-phase inverter circuit 11.

Figure 6:
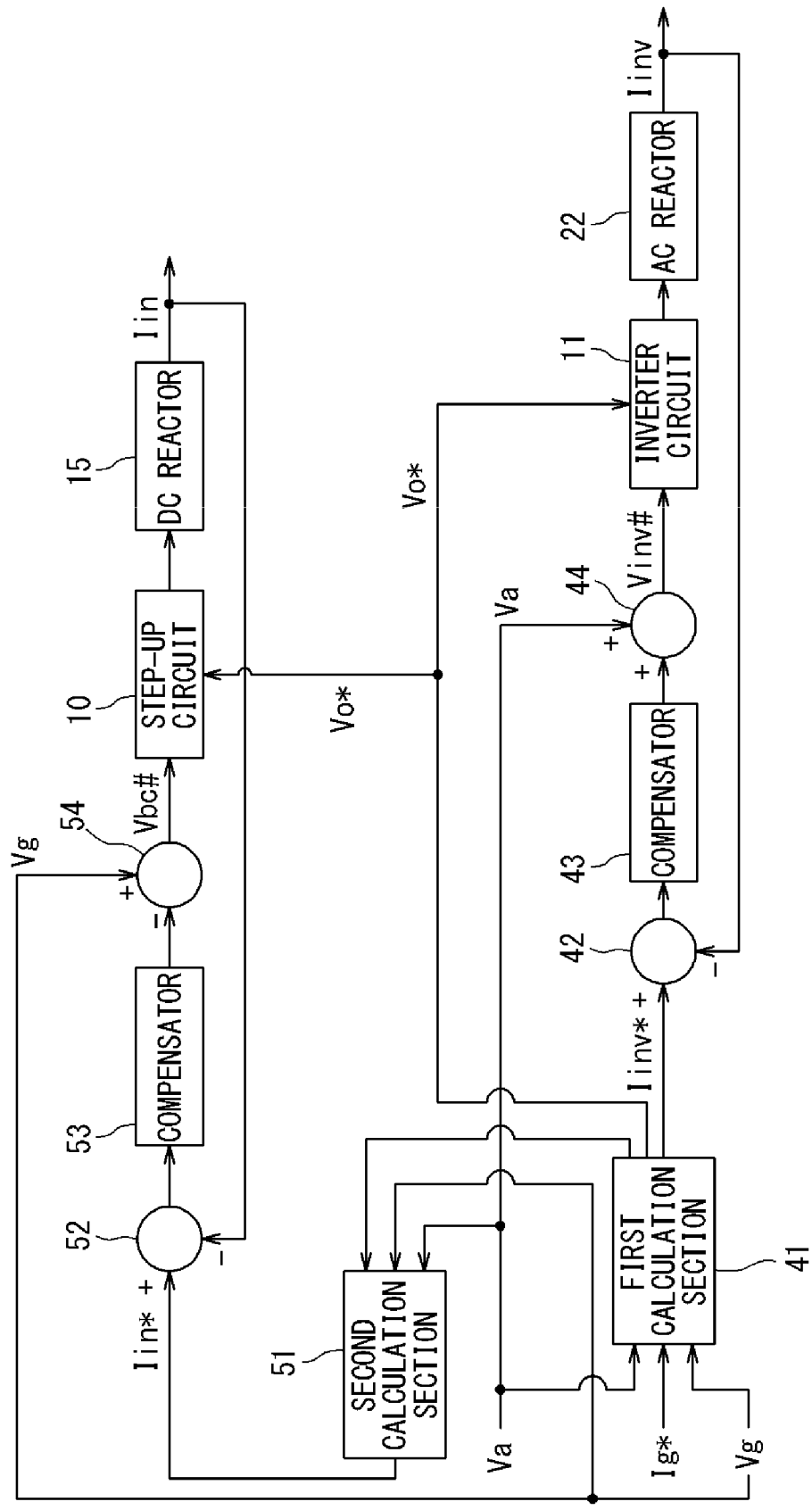
FIG. 6 is a control block diagram for explaining a control process by a control processing unit.

FIG. 6 is a control block diagram for explaining the feedback control for the step-up circuit 10 and the single-phase inverter circuit 11 by the control processing unit 30.

The control processing unit 30 includes, as function sections for controlling the single-phase inverter circuit 11, a first calculation section 41, a first adder 42, a compensator 43, and a second adder 44.

In addition, the control processing unit 30 includes, as a function section for controlling the step-up circuit 10, a second calculation section 51, a third adder 52, a compensator 53, and a fourth adder 54.

Figure 7:
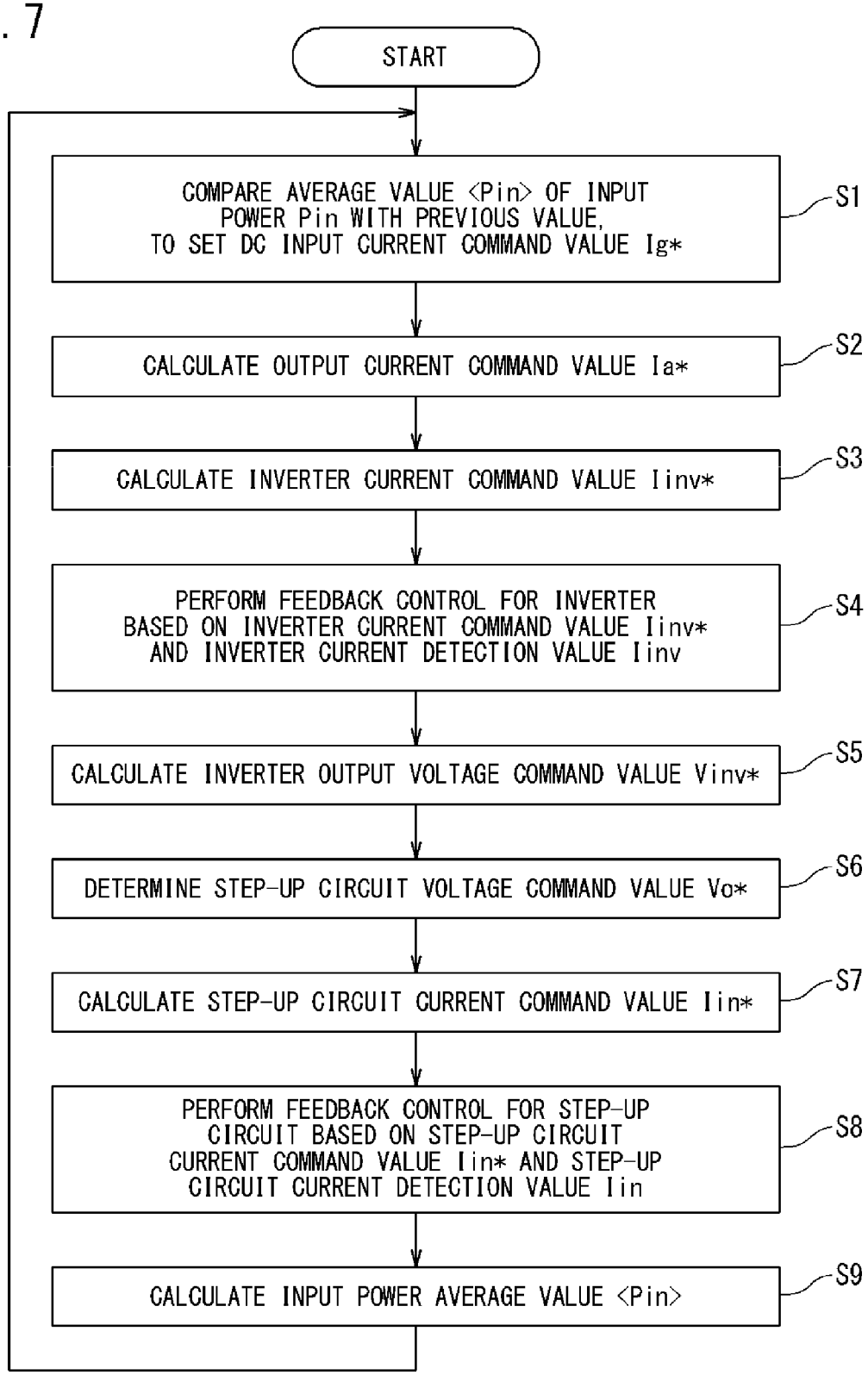
FIG. 7 is a flowchart showing a control process for a step-up circuit and a single-phase inverter circuit.

FIG. 7 is a flowchart showing a control process for the step-up circuit 10 and the single-phase inverter circuit 11. The function sections shown in FIG. 6 control the step-up circuit 10 and the single-phase inverter circuit 11 by executing the process shown in the flowchart in FIG. 7. Hereinafter, the control process for the step-up circuit 10 and the single-phase inverter circuit 11 will be described with reference to FIG. 7.

First, the control processing unit 30 calculates the present input power average value <Pin> (step S9), and compares the present input power average value <Pin> with the input power average value <Pin> that has been previously calculated, to set the DC input current command value Ig* (step S1). The input power average value <Pin> is calculated based on the following expression (1).

$$\text{Input power average value } \langle Pin \rangle = \langle Iin \times Vg \rangle \quad (1)$$

In expression (1), Iin is the step-up circuit current detection value, and Vg is the DC input voltage detection value (DC input voltage value). For these values, the DC input voltage average value <Vg> and the step-up circuit current average value <Iin> which are the values averaged by the averaging processing unit 34 are used.

In each expression other than expression (1) and relevant to the control shown below, instantaneous values which are not averaged are used for the step-up circuit current detection value Iin and the DC input voltage detection value Vg.

A notation "< >" indicates an average value of a value in the brackets. The same applies hereinafter.

The control processing unit 30 gives the set DC input current command value Ig* to the first calculation section 41.

As well as the DC input current command value Ig*, the DC input voltage detection value Vg and the system voltage detection value Va are given to the first calculation section 41.

The first calculation section 41 calculates an average value <Ia*> of an output current command value for the conversion device 1, based on the following expression (2).

$$\text{Average value } \langle Ia^* \rangle \text{ of output current command value} = \eta \langle Ig^* \times Vg \rangle / \langle Va \rangle \quad (2)$$

where η is a constant representing the conversion efficiency of the conversion device 1.

Further, the first calculation section 41 calculates an output current command value Ia* (output current target value) based on the following expression (3) (step S2).

Here, the first calculation section 41 calculates an output current command value Ia* as a sine wave having the same phase as the system voltage detection value Va.

$$\text{Output current command value } Ia^* = (\sqrt{2}) \times \langle Ia^* \rangle \times \sin \omega t \quad (3)$$

As described above, the first calculation section 41 calculates the output current command value Ia* based on the input power average value <Pin> (an input power value of DC power) and the system voltage detection value Va.

Next, the first calculation section 41 calculates an inverter current command value Iinv* (a current target value for the single-phase inverter circuit) which is a current target value for controlling the single-phase inverter circuit 11, as shown by the following expression (4) (step S3).

$$\text{Inverter current command value } Iinv^* = Ia^* + sCaVa \quad (4)$$

In expression (4), Ca is an electrostatic capacitance of the capacitor 23, and s is the Laplace operator.

The above expression (4) is represented as follows, using a derivative with respect to time t.

$$Iinv^* = Ia^* + Ca \times (dVa/dt) \quad (4a)$$

If current flowing through the capacitor 23 is detected and the detected current is denoted by Ica, the following expression is obtained.

$$Iinv^* = Ia^* + Ica \quad (4b)$$

In expressions (4), (4a), and (4b), the second term on the right-hand side is a value added in consideration of current flowing through the capacitor 23 of the filter circuit 21.

The output current command value Ia* is calculated as a sine wave having the same phase as the system voltage detection value Va, as shown by the above expression (3). That is, the control processing unit 30 controls the single-phase inverter circuit 11 so that current Ia (output current) of AC power outputted from the conversion device 1 has the same phase as the system voltage (system voltage detection value Va).

After calculating the inverter current command value Iinv*, the first calculation section 41 gives the inverter current command value Iinv* to the first adder 42.

The single-phase inverter circuit 11 is subjected to feedback control based on the inverter current command value Iinv*.

As well as the inverter current command value Iinv*, the present inverter current detection value Iinv is given to the first adder 42.

The first adder 42 calculates a difference between the inverter current command value Iinv* and the present inverter current detection value Iinv, and gives a result of the calculation to the compensator 43.

When the difference is given, the compensator 43 calculates, based on a proportionality coefficient or the like, an inverter voltage reference value Vinv# that allows the difference to converge so that the inverter current detection value Iinv becomes the inverter current command value Iinv*. The compensator 43 gives the inverter voltage reference value Vinv# to the inverter circuit control unit 33, thereby causing the single-phase inverter circuit 11 to output power with voltage Vinv according to the inverter voltage reference value Vinv#.

The power outputted from the single-phase inverter circuit 11, from which the system voltage detection value Va is subtracted by the second adder 44, is given to the AC reactor 22, and then fed back as a new inverter current detection value Iinv. Then, a difference between the inverter current command value Iinv* and the inverter current detection value Iinv is calculated again by the first adder 42, and the single-phase inverter circuit 11 is controlled based on the difference as described above.

As described above, the single-phase inverter circuit 11 is subjected to feedback control based on the inverter current command value Iinv* and the inverter current detection value Iinv (step S4).

On the other hand, the inverter current command value Iinv* calculated by the first calculation section 41, as well as the DC input voltage detection value Vg and the system voltage detection value Va, is given to the second calculation section 51.

The second calculation section 51 calculates an inverter output voltage command value Vinv* (a voltage target value for the single-phase inverter circuit) based on the following expression (5) (step S5).

$$\text{Inverter output voltage command value } Vinv^* = Va + sLaIinv^* \quad (5)$$

In expression (5), La is an inductance of the AC reactor, and s is the Laplace operator.

The above expression (5) is represented as follows, using a derivative with respect to time t.

$$Vinv^* = Va + RaIinv^* + La \times (dIinv^*/dt) \quad (5a)$$

where Ra is a resistance of the AC reactor, La is an inductance of the AC reactor, and (Za=Ra+sLa) is satisfied.

The second term on the right-hand side in expression (5) and the second term and the third term on the right-hand side in expression (5a) are values added in consideration of voltage generated between both ends of the AC reactor 22.

Thus, in the present example, the inverter output voltage command value Vinv* (voltage target value) is set based on the inverter current command value Iinv* which is the current target value for controlling the single-phase inverter circuit 11 so that current of AC power outputted from the single-phase inverter circuit 11 has the same phase as the system voltage detection value Va.

As described above, the output target values (Iinv*, Vinv*) for the single-phase inverter circuit 11 which are target values on the AC side are set at a bridge output end of the single-phase inverter circuit 11, i.e., a circuit connection point between the single-phase inverter circuit 11 and the filter circuit 21. Thus, the system interconnection is performed such that a point where the target values are set is moved to a stage preceding the original system interconnection point (a circuit connection point between the system phase power supply 3p and the filter circuit 21), whereby appropriate system interconnection is finally reached.

It is preferable that the inductance La in expression (5) is common among the AC reactors 22 for the three phases. By the setting of the inverter output voltage command value Vinv* as described above, since both the step-up circuit 10 and the single-phase inverter circuit 11 operate based on the current target value Iinv* set by the control unit 12, occurrence of phase-deviation or distortion in AC current outputted from each conversion device 1 can be suppressed even if operation is performed so as to alternately switch the high-frequency switching period between the two circuits.

After calculating the inverter output voltage command value Vinv*, the second calculation section 51 compares the voltage Vg or preferably the following DC voltage Vgf, as voltage $V_{DC}$ on the DC power supply side, with an absolute value of the inverter output voltage target value Vinv*, and determines the greater one to be the step-up circuit voltage target value Vo* as shown by the following expression (6) (step S6). The DC voltage Vgf is voltage calculated by considering voltage drop due to an impedance Z of the DC reactor 15 for Vg, and in a case where the step-up circuit current is denoted by Iin, Vgf is represented as Vgf=Vg−ZIin. Accordingly, Vo* can be represented as follows.

$$Vo^* = \text{Max}(Vg - ZIin, \text{absolute value of } Vinv^*) \quad (6)$$

The above expression (6) is represented as follows, using a derivative with respect to time t.

$$Vo^* = \text{Max}(Vg - (RIin + L(dIin/dt)), \text{absolute value of } Vinv^*) \quad (6a)$$

where R is a resistance of the DC reactor, L is an inductance of the DC reactor, and (Z=R+sL) is satisfied.

Further, the second calculation section 51 calculates a step-up circuit current command value Iin* based on the following expression (7) (step S7).

$$\text{Step-up circuit current command value } Iin^* = \{(Iinv^* \times Vinv^*) + (sCVo^*) \times Vo^*\}/(Vg - ZIin) \quad (7)$$

In expression (7), C is an electrostatic capacitance of the capacitor 19, and s is the Laplace operator.

The above expression (7) is represented as follows, using a derivative with respect to time t.

$$Iin^* = \{(Iinv^* \times Vinv^*) + C \times (dVo^*/dt) \times Vo^*\}/\{Vg - (R + sL)Iin\} \quad (7a)$$

If current flowing through the capacitor 19 is detected and the detected current is denoted by Ic, the following expression is obtained.

$$Iin^* = \{(Iinv^* \times Vinv^*) + Ic \times Vo^*\}/\{Vg - ZIin\} \quad (7b)$$

In expressions (7), (7a), and (7b), a term added to an absolute value of a product of the inverter current command value Iinv* and the inverter output voltage command value Vinv* is a value added in consideration of reactive power passing through the capacitor 19. That is, consideration of the reactive power in addition to the power target value for the single-phase inverter circuit 11 allows for more accurate calculation of the value of Iin*.

Further, if power loss $P_{LOSS}$ of the conversion device 1 is measured in advance, the above expression (7a) can be represented as follows.

$$Iin^* = \{(Iinv^* \times Vinv^*) + C \times (dVo^*/dt) \times Vo^* + P_{LOSS}\}/\{Vg - ZIin\} \quad (7c)$$

Similarly, the above expression (7b) can be represented as follows.

$$Iin^* = \{(Iinv^* \times Vinv^*) + Ic \times Vo^* + P_{LOSS}\}/\{Vg - ZIin\} \quad (7d)$$

In this case, consideration of the reactive power and the power loss $P_{LOSS}$ in addition to the power target value of the single-phase inverter circuit 11 allows for more strict calculation of the value of Iin*.

If the electrostatic capacitance C and the power loss $P_{LOSS}$ of the capacitor 19 are sufficiently smaller than (Tinv* × Vinv*), the following expression (8) is obtained. Iin* calculated by this expression (8) can be used as Iin contained in the right-hand sides of expressions (6), (6a), (7), (7a), (7b), (7c), and (7d).

$$\text{Step-up circuit current target value } Iin^* = (Tinv^* \times Vinv^*)/Vg \quad (8)$$

After calculating the step-up circuit current command value Iin*, the second calculation section 51 gives the step-up circuit current command value Iin* to the third adder 52.

The step-up circuit 10 is subjected to feedback control based on the step-up circuit current command value Iin*.

As well as the step-up circuit current command value Iin*, the present step-up circuit current detection value Iin is given to the third adder 52.

The third adder 52 calculates a difference between the step-up circuit current command value Iin* and the present step-up circuit current detection value Iin, and gives a result of the calculation to the compensator 53.

When the above difference is given, the compensator 53 calculates, based on a proportionality coefficient or the like, a step-up circuit voltage reference value Vbc# that allows the difference to converge so that the step-up circuit current detection value Iin becomes the step-up circuit current command value Iin*. The compensator 53 gives the step-up circuit voltage reference value Vbc# to the step-up circuit control unit 32, thereby causing the step-up circuit 10 to output power with voltage Vo according to the step-up circuit voltage reference value Vbc#.

The power outputted from the step-up circuit 10, from which the DC input voltage detection value Vg is subtracted by the fourth adder 54, is given to the DC reactor 15, and then fed back as a new step-up circuit current detection value Iin. Then, a difference between the step-up circuit current command value Iin* and the step-up circuit current detection value Iin is calculated again by the third adder 52, and the step-up circuit 10 is controlled based on the difference as described above.

As described above, the step-up circuit 10 is subjected to feedback control based on the step-up circuit current command value Iin* and the step-up circuit current detection value Iin (step S8).

After the above step S8, the control processing unit 30 calculates the present input power average value <Pin> based on the above expression (1) (step S9).

Based on comparison with the input power average value <Pin> that has been previously calculated, the control processing unit 30 sets the DC input current command value Ig* so that the input power average value <Pin> becomes a maximum value (follows the maximum power point).

Thus, the control processing unit 30 controls the step-up circuit 10 and the single-phase inverter circuit 11 while performing MPPT control for the photovoltaic panel 2.

As described above, the control processing unit 30 performs feedback control for the single-phase inverter circuit 11 and the step-up circuit 10 by the current command values.

Figure 8:
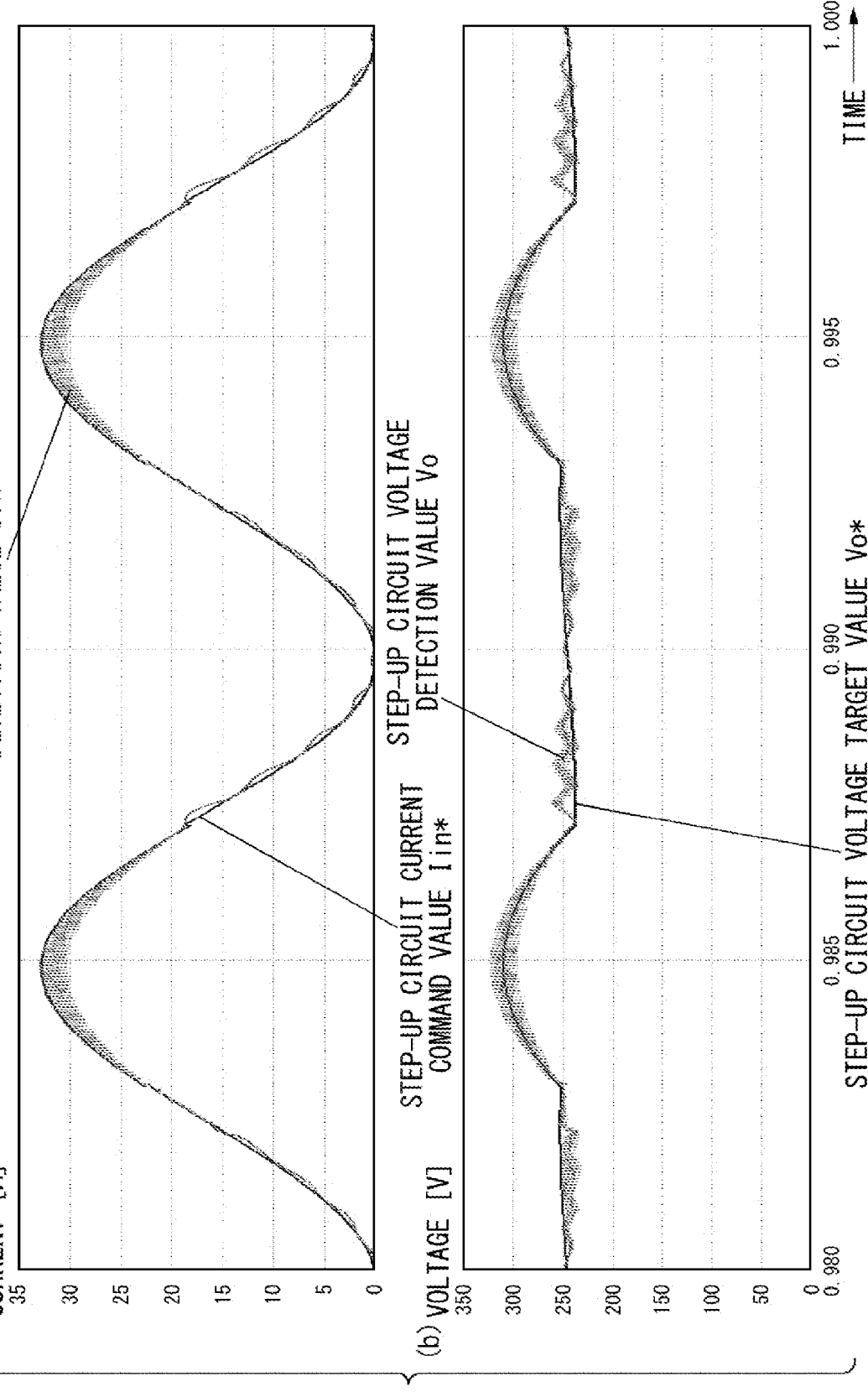
FIG. 8 is graphs in which (a) shows an example of a simulation result of a step-up circuit current command value calculated in a feedback control by the control processing unit, and a step-up circuit current detection value obtained when control is performed in accordance with the step-up circuit current command value, and (b) shows an example of a simulation result of a step-up circuit voltage target value calculated in the feedback control by the control processing unit, and a step-up circuit voltage detection value obtained when control is performed in accordance with the step-up circuit voltage target value.

FIG. 8 is graphs in which (a) shows an example of a simulation result of the step-up circuit current command value Iin* calculated in the above feedback control by the control processing unit 30, and the step-up circuit current detection value Iin obtained when control is performed in accordance with the step-up circuit current command value Iin*, and (b) shows an example of a simulation result of the step-up circuit voltage target value Vo* calculated in the above feedback control by the control processing unit 30, and the step-up circuit voltage detection value Vo obtained when control is performed in accordance with the step-up circuit voltage target value Vo*.

As shown in (a) of FIG. 8, it is found that the step-up circuit current detection value Iin is controlled along the step-up circuit current command value Iin* by the control processing unit 30.

As shown in (b) of FIG. 8, since the step-up circuit voltage target value Vo* is calculated by the above expression (6), the step-up circuit voltage target value Vo* varies so as to follow an absolute value of the inverter output voltage command value Vinv* during a period in which the absolute value of the inverter output voltage command value Vinv* is generally equal to or greater than the DC input voltage detection value Vg, and follow the DC input voltage detection value Vg during the other period.

It is found that the step-up circuit voltage detection value Vo is controlled along the step-up circuit voltage target value Vo* by the control processing unit 30.

Figure 9:
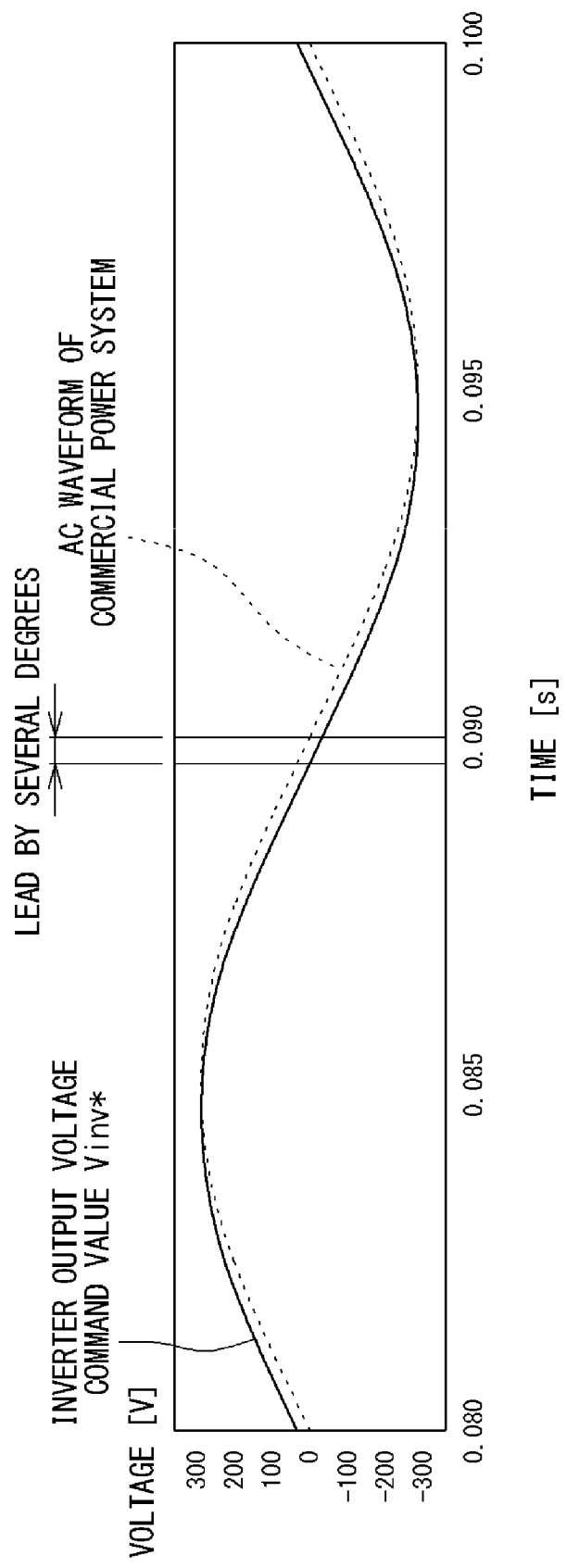
FIG. 9 is a diagram showing an example of an inverter output voltage command value.

FIG. 9 is a diagram showing an example of the inverter output voltage command value Vinv*. In FIG. 9, the vertical axis indicates voltage and the horizontal axis indicates time. A broken line indicates a voltage waveform of the system phase power supply 3p, and a solid line indicates a waveform of the inverter output voltage command value Vinv*.

The conversion device 1 outputs power, using the inverter output voltage command value Vinv* shown in FIG. 9 as a voltage target value, through the control according to the flowchart in FIG. 7.

Therefore, the conversion device 1 outputs power having voltage according to the waveform of the inverter output voltage command value Vinv* shown in FIG. 9.

As shown in FIG. 9, the two waveforms have almost the same voltage value and the same frequency, but the phase of the inverter output voltage command value Vinv* leads the phase of voltage of the system phase power supply 3p by several degrees.

The control processing unit 30 of the present example causes the phase of the inverter output voltage command value Vinv* to lead the phase of voltage of the system phase power supply 3p by about three degrees while executing the feedback control for the step-up circuit 10 and the single-phase inverter circuit 11, as described above.

The degree of angle by which the phase of the inverter output voltage command value Vinv* is caused to lead the phase of voltage of the system phase power supply 3p may be several degrees, and as described later, the degree of angle is set within such a range that the phase of a voltage waveform of a difference from a voltage waveform of the system phase power supply 3p leads the phase of the voltage waveform of the system phase power supply 3p by almost 90 degrees. For example, the degree of the phase leading angle is set to be greater than 0 degrees and smaller than 10 degrees.

The degree of the phase leading angle is determined by the system voltage detection value Va, the inductance La of the AC reactor 22, and the inverter current command value Iinv* as shown by the above expression (5). Of these values, the system voltage detection value Va and the inductance La of the AC reactor 22 are fixed values that are not control targets. Therefore, the degree of the phase leading angle is determined by the inverter current command value Iinv*.

The inverter current command value Iinv* is determined by the output current command value Ia* as shown by the above expression (4). As the output current command value Ia* increases, a phase leading component of the inverter current command value Iinv* increases, and a leading angle (phase leading angle) of the inverter output voltage command value Vinv* increases.

Since the output current command value Ia* is calculated by the above expression (2), the phase leading angle is adjusted by the DC input current command value Ig*.

The control processing unit 30 of the present example sets the DC input current command value Ig* so that the phase of the inverter output voltage command value Vinv* leads the phase of voltage of the system phase power supply 3p by about three degrees, as described above.

[1.2 Control for Step-Up Circuit and Single-Phase Inverter Circuit]

The step-up circuit control unit 32 controls the switching elements Qa and Qb of the step-up circuit 10. The inverter circuit control unit 33 controls the switching elements Q1 to Q4 of the single-phase inverter circuit 11.

The step-up circuit control unit 32 and the inverter circuit control unit 33 respectively generate a step-up circuit carrier wave and an inverter circuit carrier wave, and respectively modulate these carrier waves with the step-up circuit voltage reference value Vbc# and the inverter voltage reference value Vinv# which are command values given from the control processing unit 30, to generate drive waveforms for driving each switching element.

The step-up circuit control unit 32 and the inverter circuit control unit 33 control each switching element based on the drive waveforms, thereby causing the step-up circuit 10 and the single-phase inverter circuit 11 to output AC powers having current waveforms approximate to the step-up circuit current command value Iin* and the inverter current command value Iinv*, respectively.

Figure 10:
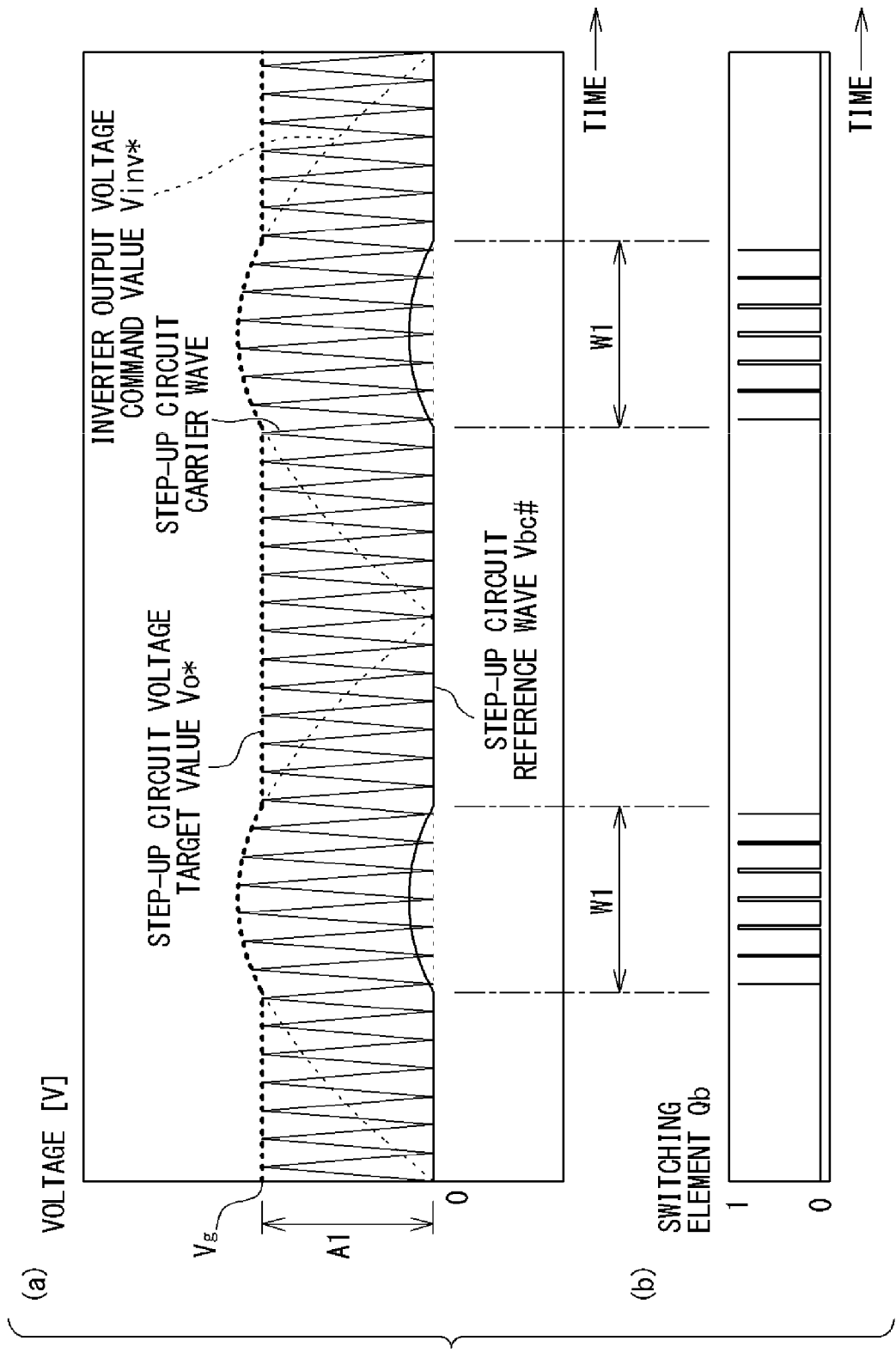
FIG. 10 is graphs in which (a) shows comparison between a step-up circuit carrier wave and a step-up circuit reference wave, and (b) shows a drive waveform for driving a switching element Qb, generated by a step-up circuit control unit.

In FIG. 10, (a) is a graph showing comparison between the step-up circuit carrier wave and a waveform of the step-up circuit voltage reference value Vbc#. In (a) of FIG. 10, the vertical axis indicates voltage and the horizontal axis indicates time. In (a) of FIG. 10, for facilitating the understanding, the wavelength of the step-up circuit carrier wave is elongated as compared to the actual wavelength.

The step-up circuit carrier wave generated by the step-up circuit control unit 32 is a triangle wave having a minimum value of "0", and has an amplitude A1 set at the step-up circuit voltage target value Vo* given from the control processing unit 30.

The frequency of the step-up circuit carrier wave is set by the step-up circuit control unit 32 in accordance with a control command from the control processing unit 30, so as to realize a predetermined duty cycle.

As described above, the step-up circuit voltage target value Vo* varies so as to follow an absolute value of the inverter output voltage command value Vinv* during a period W1 in which the absolute value of the inverter output voltage command value Vinv* is generally equal to or greater than the DC input voltage detection value Vg, and follow the DC input voltage detection value Vg during the other period. Therefore, the amplitude A1 of the step-up circuit carrier wave also varies in accordance with the step-up circuit voltage target value Vo*.

A waveform (hereinafter, may be referred to as a step-up circuit reference wave Vbc#) of the step-up circuit voltage reference value Vbc# corresponds to a value calculated based on the step-up circuit current command value Iin* by the control processing unit 30, and has a positive value during the period W1 in which the absolute value of the inverter output voltage command value Vinv* is greater than the DC input voltage detection value Vg. During the period W1, the step-up circuit reference wave Vbc# has a waveform approximate to the shape of a waveform created by the step-up circuit voltage target value Vo*, and crosses the step-up circuit carrier wave.

The step-up circuit control unit 32 compares the step-up circuit carrier wave with the step-up circuit reference wave Vbc#, and generates a drive waveform for driving the switching element Qb so as to be turned on during a period in which the step-up circuit reference wave Vbc# which is a target value for voltage between both ends of the DC reactor 15 is equal to or greater than the step-up circuit carrier wave, and to be turned off during a period in which the step-up circuit reference wave Vbc# is equal to or smaller than the carrier wave.

In FIG. 10, (b) shows the drive waveform for driving the switching element Qb, generated by the step-up circuit control unit 32. In (b) of FIG. 10, the vertical axis indicates voltage and the horizontal axis indicates time. The horizontal axis in (b) of FIG. 10 coincides with that in (a) of FIG. 10.

The drive waveform indicates switching operation of the switching element Qb. When the drive waveform is given to the switching element Qb, the switching element Qb is caused to perform switching operation in accordance with the drive waveform. The drive waveform forms a control command to turn off the switching element when the voltage is 0 volts and turn on the switching element when the voltage is a plus voltage.

The step-up circuit control unit 32 generates the drive waveform so that the switching operation is performed during the period W1 in which the absolute value of the inverter output voltage command value Vinv* is equal to or greater than the DC input voltage detection value Vg. Therefore, in a range in which the absolute value is equal to or smaller than the DC input voltage detection value Vg, the switching element Qb is controlled to stop the switching operation. Each pulse width is determined by an intercept of the step-up circuit carrier wave which is a triangle wave. Therefore, the pulse width is greater at a part where voltage is higher.

As described above, the step-up circuit control unit 32 modulates the step-up circuit carrier wave with the step-up circuit reference wave Vbc#, to generate the drive waveform representing pulse widths for switching. The step-up circuit control unit 32 performs PWM control for the switching element Qb of the step-up circuit 10, based on the generated drive waveform.

A drive waveform inverted from the drive waveform for the switching element Qb is used for the switching element Qa. In order to prevent the switching element Qb and the switching element Qa from conducting currents at the same time, a dead time of about 1 microsecond is provided at a part where a drive pulse for the switching element Qa shifts from OFF to ON.

Figure 11:
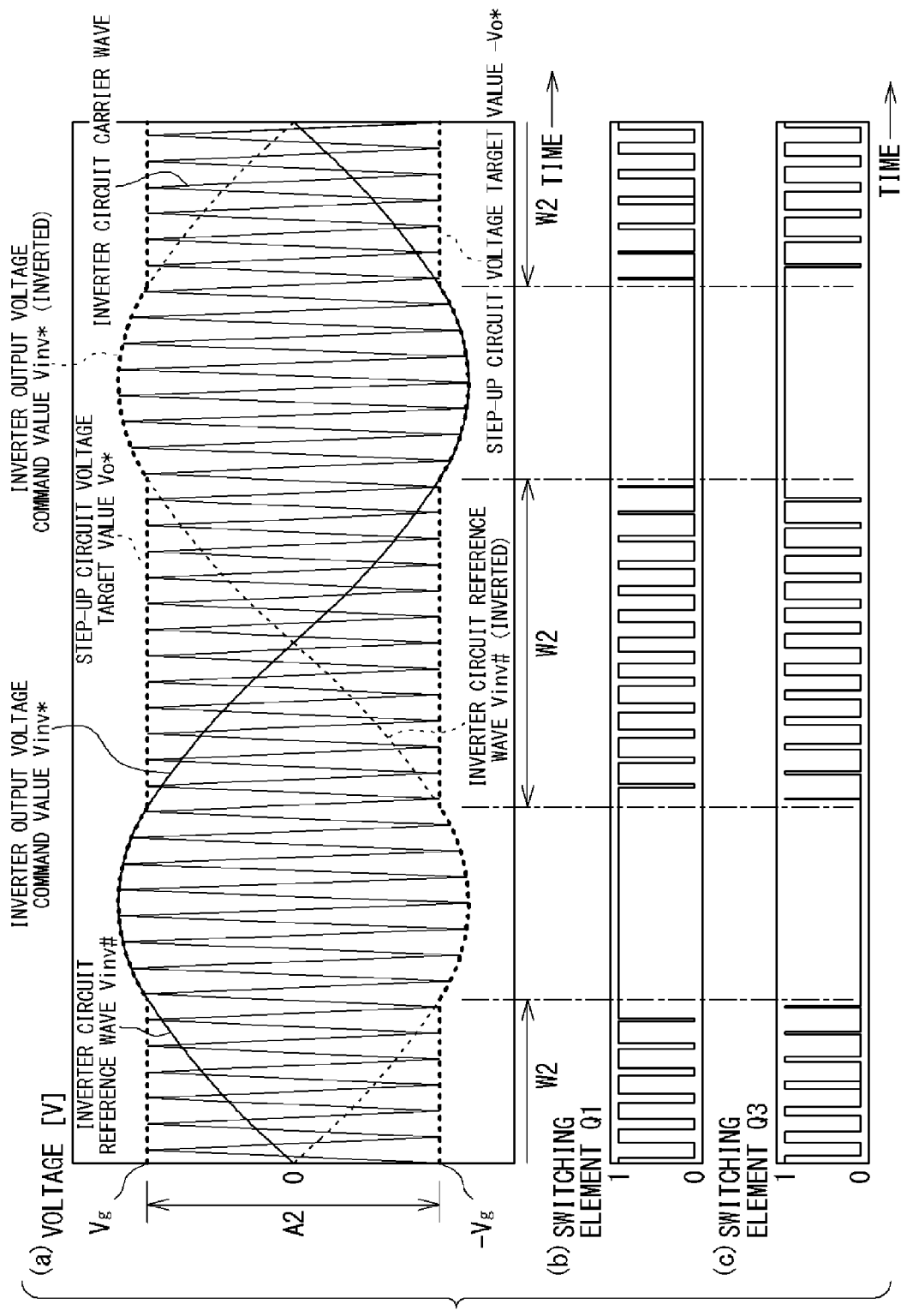
FIG. 11 is graphs in which (a) shows comparison between an inverter circuit carrier wave and an inverter circuit reference wave, (b) shows a drive waveform for driving a switching element Q1, generated by an inverter circuit control unit, and (c) shows a drive waveform for driving a switching element Q3, generated by the inverter circuit control unit.

In FIG. 11, (a) is a graph showing comparison between the inverter circuit carrier wave and a waveform of the inverter voltage reference value Vinv#. In (a) of FIG. 11, the vertical axis indicates voltage and the horizontal axis indicates time. Also in (a) of FIG. 11, for facilitating the understanding, the wavelength of the inverter circuit carrier wave is elongated as compared to the actual wavelength.

The inverter circuit carrier wave generated by the inverter circuit control unit 33 is a triangle wave having an amplitude center at 0 volts, and a one-side amplitude thereof is set at the step-up circuit voltage target value Vo* (a voltage target value for the capacitor 23). Therefore, the inverter circuit carrier wave has a period in which an amplitude A2 thereof is twice as great as the DC input voltage detection value Vg and a period in which the amplitude A2 is twice as great as voltage of the system phase power supply 3p.

The frequency thereof is set by the inverter circuit control unit 33 in accordance with a control command from the control processing unit 30, or the like, so as to realize a predetermined duty cycle.

As described above, the step-up circuit voltage target value Vo* varies to follow an absolute value of the inverter output voltage command value Vinv* during the period W1 in which the absolute value of the inverter output voltage command value Vinv* is generally equal to or greater than the DC input voltage detection value Vg, and follow the DC input voltage detection value Vg during the other period, i.e., a period W2. Therefore, the amplitude A2 of the inverter circuit carrier wave also varies in accordance with the step-up circuit voltage target value Vo*.

A waveform (hereinafter, may be referred to as an inverter circuit reference wave Vinv#) of the inverter voltage reference value Vinv# corresponds to a value calculated based on the inverter current command value Iinv* by the control processing unit 30, and is set to have generally the same amplitude as the voltage amplitude of the system phase power supply 3p. Therefore, the inverter circuit reference wave Vinv# crosses the inverter circuit carrier wave in a range where the voltage value is between −Vg and +Vg.

The inverter circuit control unit 33 compares the inverter circuit carrier wave with the inverter circuit reference wave Vinv#, and generates drive waveforms for driving the switching elements Q1 to Q4 so as to be turned on during a period in which the inverter circuit reference wave Vinv# which is a voltage target value is equal to or greater than the inverter circuit carrier wave, and to be turned off during a period in which the inverter circuit reference wave Vinv# is equal to or smaller than the carrier wave.

In FIG. 11, (b) shows the drive waveform for driving the switching element Q1, generated by the inverter circuit control unit 33. In (b) of FIG. 11, the vertical axis indicates voltage and the horizontal axis indicates time. The horizontal axis in (b) of FIG. 11 coincides with that in (a) of FIG. 11.

The inverter circuit control unit 33 generates the drive waveform so that the switching operation is performed in the range W2 in which voltage of the inverter circuit reference wave Vinv# is between −Vg and +Vg. Therefore, in the other range, the switching element Q1 is controlled to stop the switching operation.

In FIG. 11, (c) shows the drive waveform for driving the switching element Q3, generated by the inverter circuit control unit 33. In (c) of FIG. 11, the vertical axis indicates voltage and the horizontal axis indicates time.

The inverter circuit control unit 33 compares the carrier wave with a waveform indicated by a broken line in (a) of FIG. 11, which is inverted from the inverter circuit reference wave Vinv#, to generate the drive waveform for the switching element Q3.

Also in this case, the inverter circuit control unit 33 generates the drive waveform so that the switching operation is performed in the range W2 in which voltage of (a waveform inverted from) the inverter circuit reference wave Vinv# is between −Vg and +Vg. Therefore, in the other range, the switching element Q3 is controlled to stop the switching operation.

The inverter circuit control unit 33 generates, as the drive waveform for the switching element Q2, a waveform inverted from the drive waveform for the switching element Q1, and generates, as the drive waveform for the switching element Q4, a waveform inverted from the drive waveform for the switching element Q3.

As described above, the inverter circuit control unit 33 modulates the inverter circuit carrier wave with the inverter circuit reference wave Vinv#, to generate the drive waveforms representing pulse widths for switching. The inverter circuit control unit 33 performs PWM control for the switching elements Q1 to Q4 of the single-phase inverter circuit 11, based on the generated drive waveforms.

The step-up circuit control unit 32 of the present example causes the step-up circuit 10 to output power so that current flowing in the DC reactor 15 coincides with the step-up circuit current command value Iin*. As a result, the step-up circuit 10 is caused to perform switching operation during the period W1 (FIG. 10) in which an absolute value of the inverter output voltage command value Vinv* is generally equal to or greater than the DC input voltage detection value Vg. The step-up circuit 10 outputs power having voltage equal to or greater than the DC input voltage detection value Vg and approximate to the absolute value of the inverter output voltage command value Vinv*, during the period W1. On the other hand, during the period in which the absolute value of the inverter output voltage command value Vinv* is generally equal to or smaller than the DC input voltage detection value Vg, the step-up circuit control unit 32 stops the switching operation of the step-up circuit 10. Therefore, during the period in which the absolute value is equal to or smaller than the DC input voltage detection value Vg, the step-up circuit 10 outputs, to the single-phase inverter circuit 11, DC power outputted from the photovoltaic panel 2 without stepping up the voltage of the DC power.

The inverter circuit control unit 33 of the present example causes the single-phase inverter circuit 11 to output power so that current flowing in the AC reactor 22 coincides with the inverter current command value Iinv*. As a result, the single-phase inverter circuit 11 is caused to perform switching operation during the period W2 (FIG. 11) in which the inverter output voltage command value Vinv* is generally between −Vg and +Vg. That is, the single-phase inverter circuit 11 is caused to perform switching operation during a period in which an absolute value of the inverter output voltage command value Vinv* is equal to or smaller than the DC input voltage detection value Vg.

Therefore, while switching operation of the step-up circuit 10 is stopped, the single-phase inverter circuit 11 performs switching operation to output AC power approximate to the inverter output voltage command value Vinv*.

Since the inverter circuit reference wave Vinv# and the inverter output voltage command value Vinv* are approximate to each other, they overlap each other in (a) of FIG. 11.

On the other hand, in the period other than the period W2 in which voltage of the inverter output voltage command value Vinv* is generally between −Vg and +Vg, the inverter circuit control unit 33 stops the switching operation of the single-phase inverter circuit 11. During this period, power stepped up by the step-up circuit 10 is given to the single-phase inverter circuit 11. Therefore, the single-phase inverter circuit 11 whose switching operation is stopped outputs the power given from the step-up circuit 10, without stepping down the voltage thereof.

That is, the conversion device 1 of the present example causes the step-up circuit 10 and the single-phase inverter circuit 11 to perform switching operations so as to be alternately switched therebetween, and superimposes their respective output powers on each other, thereby outputting AC power having a voltage waveform approximate to the inverter output voltage command value Vinv*.

Thus, in the present example, control is performed so that the step-up circuit 10 is operated in a case of outputting voltage corresponding to the part where the absolute value of the inverter output voltage command value Vinv* is higher than the DC input voltage detection value Vg, and the single-phase inverter circuit 11 is operated in a case of outputting voltage corresponding to the part where the absolute value of the inverter output voltage command value Vinv* is lower than the DC input voltage detection value Vg. Therefore, since the single-phase inverter circuit 11 does not step down the power that has been stepped up by the step-up circuit 10, a potential difference in stepping down of the voltage can be reduced, whereby loss due to switching of the step-up circuit is reduced and AC power can be outputted with increased efficiency.

Further, since both the step-up circuit 10 and the single-phase inverter circuit 11 operate based on the inverter output voltage command value Vinv* (voltage target value) set by the control unit 12, occurrence of deviation or distortion between power of the step-up circuit and power of the single-phase inverter circuit which are outputted so as to be alternately switched can be suppressed.

Figure 12:
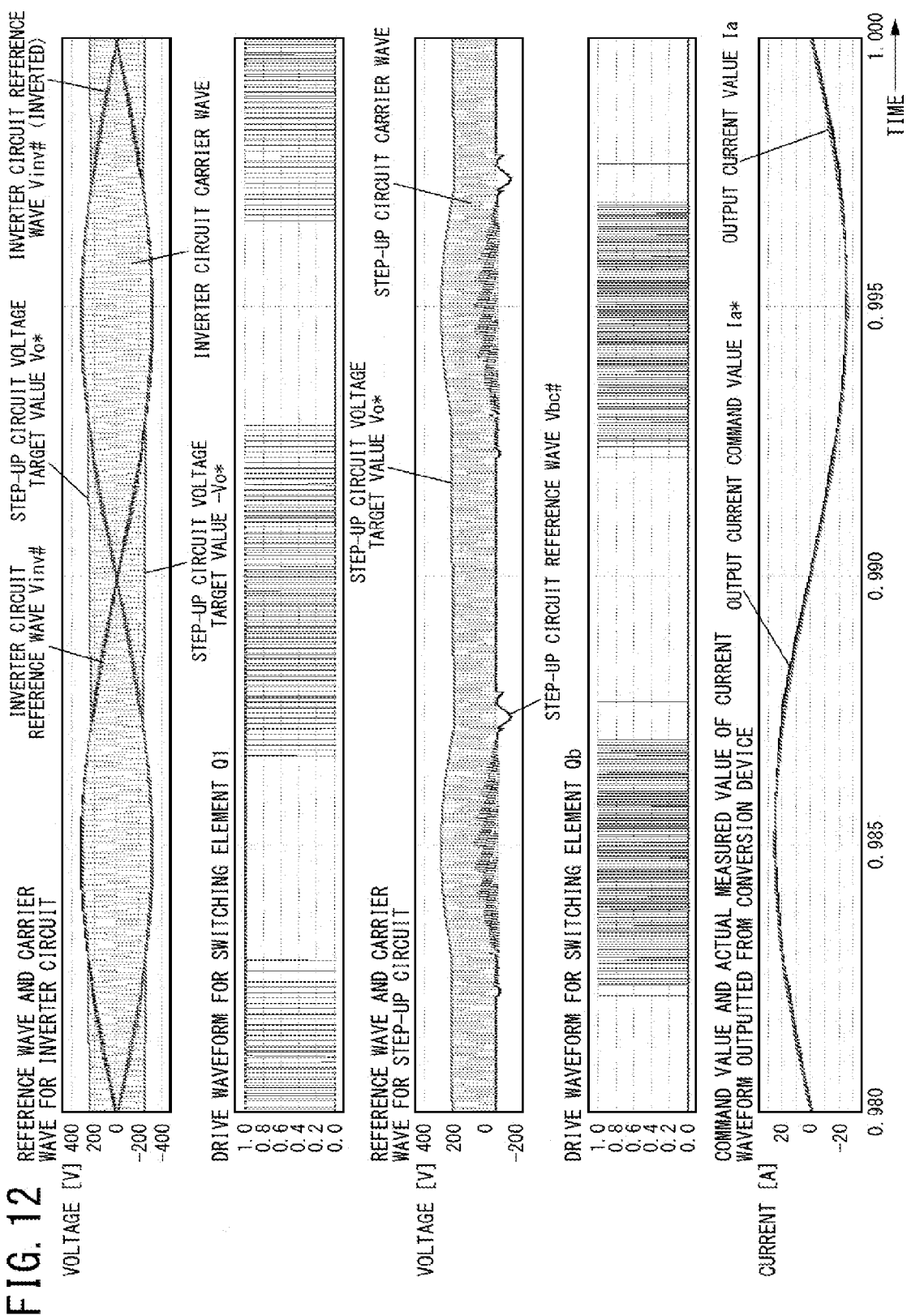
FIG. 12 is a diagram showing examples of reference waves and drive waveforms for switching elements, and an example of a current waveform of AC power outputted from the conversion device.

FIG. 12 is a diagram showing examples of the reference waves and the drive waveforms for the switching elements, and an example of a current waveform of AC power outputted from the conversion device 1.

FIG. 12 shows graphs of, from the uppermost side, the reference wave Vinv# and the carrier wave for the single-phase inverter circuit, the drive waveform for the switching element Q1, the reference wave Vbc# and the carrier wave for the step-up circuit, the drive waveform for the switching element Qb, and the command value and an actual measured value of a current waveform of AC power outputted from the conversion device 1. The horizontal axes of these graphs indicate time, and coincide with each other.

As shown in FIG. 12, it is found that output current is controlled so that an actual measured value Ia thereof coincides with the command value Ia*.

In addition, it is found that the period in which the switching element Qb of the step-up circuit 10 performs switching operation and the period in which the switching elements Q1 to Q4 of the single-phase inverter circuit 11 perform switching operations are controlled so as to be generally alternately switched therebetween.

In the present example, as shown in (a) of FIG. 8, the step-up circuit is controlled so that current flowing in the DC reactor 15 coincides with the current command value Iin* calculated based on the above expression (7). As a result, voltages of the step-up circuit and the single-phase inverter circuit have waveforms as shown in (b) of FIG. 8, and it becomes possible to perform such an operation that high-frequency switching operations of the step-up circuit 10 and the single-phase inverter circuit 11 have respective stop periods and the switching operations are performed generally alternately.

Ideally, it is preferable that the step-up circuit 10 and the single-phase inverter circuit 11 "alternately" perform high-frequency switching so that their respective periods of high-frequency switching do not overlap each other. However, in practice, even if both periods slightly overlap each other, as long as a stop period is provided for each of the step-up circuit 10 and the single-phase inverter circuit 11, the loss can be reduced, leading to enhancement in the efficiency.

[1.3 Current Phase of Outputted AC Power]

The step-up circuit 10 and the single-phase inverter circuit 11 of the present example output AC power having a voltage waveform approximate to the inverter output voltage command value Vinv*, to the filter circuit 21 connected at the subsequent stage, through the control by the control unit 12. The conversion device 1 outputs AC power to the system phase power supply 3p via the filter circuit 21.

Here, the inverter output voltage command value Vinv* is generated by the control processing unit 30 so as to have a voltage phase leading the voltage phase of the system phase power supply 3p by several degrees as described above.

Therefore, AC voltage outputted by the step-up circuit 10 and the single-phase inverter circuit 11 also has a voltage phase leading the voltage phase of the system phase power supply 3p by several degrees.

As a result, the AC voltage from the step-up circuit 10 and the single-phase inverter circuit 11 is applied to one end of the AC reactor 22 (FIG. 2) of the filter circuit 21, and voltage of the system phase power supply 3p is applied to the other end. Thus, voltages having phases shifted from each other by several degrees are applied to the respective ends of the AC reactor 22.

Figure 13:
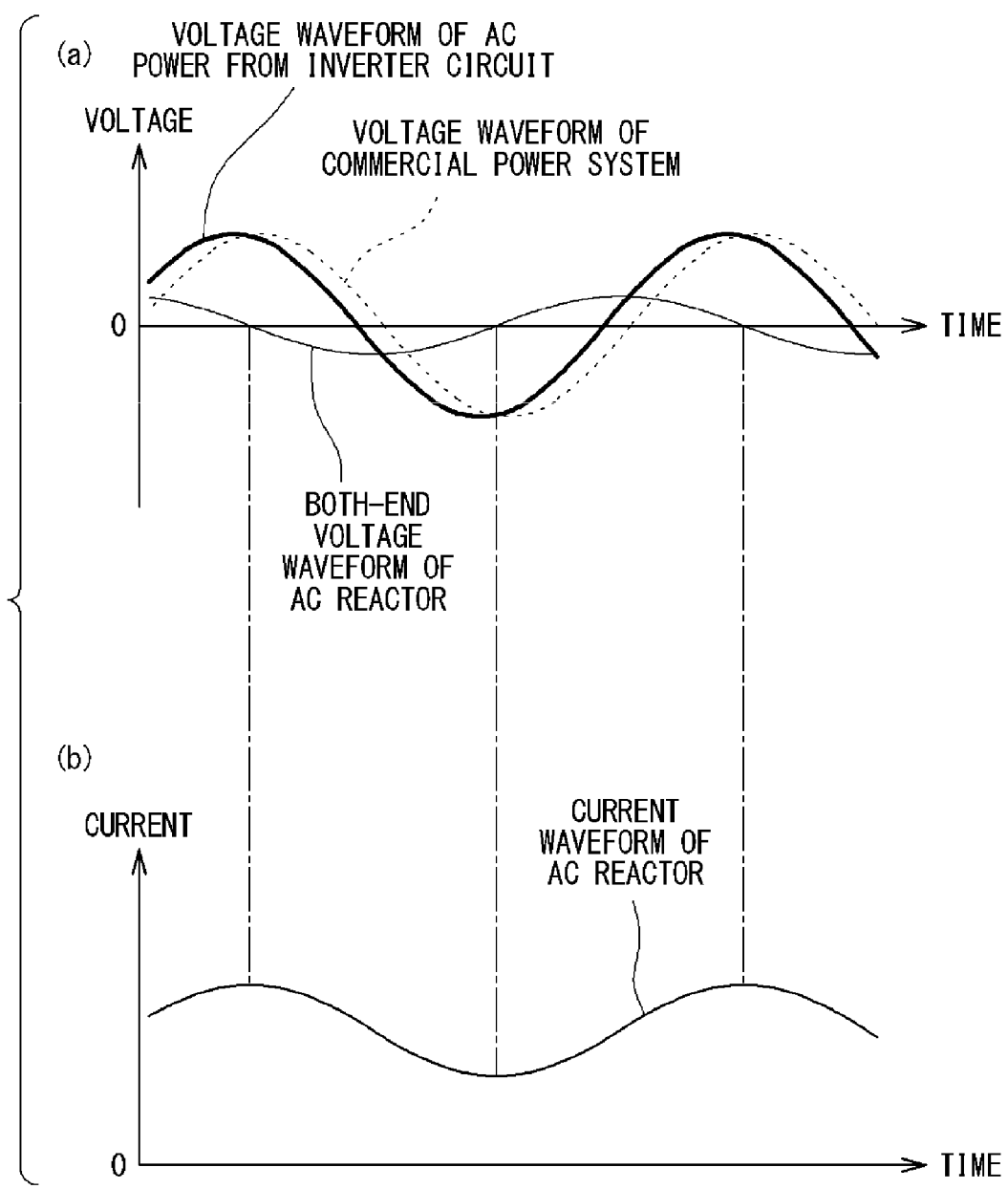
FIG. 13 is graphs in which (a) shows voltage waveforms of AC voltage outputted from the single-phase inverter circuit, a system phase power supply, and voltage between both ends of an AC reactor, and (b) shows a waveform of current flowing in the AC reactor.

In FIG. 13, (a) is a graph showing voltage waveforms of AC voltage outputted from the single-phase inverter circuit 11, the system phase power supply 3p, and voltage between both ends of the AC reactor 22. In (a) of FIG. 13, the vertical axis indicates voltage and the horizontal axis indicates time.

As shown in (a) of FIG. 13, when voltages having phases shifted from each other by several degrees are applied to the respective ends of the AC reactor 22, the voltage between both ends of the AC reactor 22 is equal to a difference between the voltages applied to the respective ends of the AC reactor 22 and having phases shifted from each other by several degrees.

Therefore, as shown in (a) of FIG. 13, the phase of voltage between both ends of the AC reactor 22 leads the phase of voltage of the system phase power supply 3p by almost 90 degrees.

In FIG. 13, (b) is a graph showing a waveform of current flowing in the AC reactor 22. In (b) of FIG. 13, the vertical axis indicates current and the horizontal axis indicates time. The horizontal axis in (b) of FIG. 13 coincides with that in (a) of FIG. 13.

The current phase of the AC reactor 22 lags the voltage phase thereof by 90 degrees. Therefore, as shown in (b) of FIG. 13, the current phase of AC power outputted through the AC reactor 22 is almost synchronized with the phase of the phase voltage of the system phase power supply 3p.

Therefore, although the phase of voltage outputted from the single-phase inverter circuit 11 leads the phase of the system phase power supply 3p by several degrees, the phase of current outputted from the single-phase inverter circuit 11 almost coincides with the phase of the phase voltage of the system phase power supply 3p.

Therefore, as shown in the lowermost graph in FIG. 12, the phase of a current waveform outputted from the conversion device 1 almost coincides with the voltage phase of the system phase power supply 3p.

As a result, AC current almost in phase with voltage of the system phase power supply 3p can be outputted, whereby reduction in a power factor of the AC power can be suppressed.

<<Example of Combination with Photovoltaic Panels>>

Figure 17:
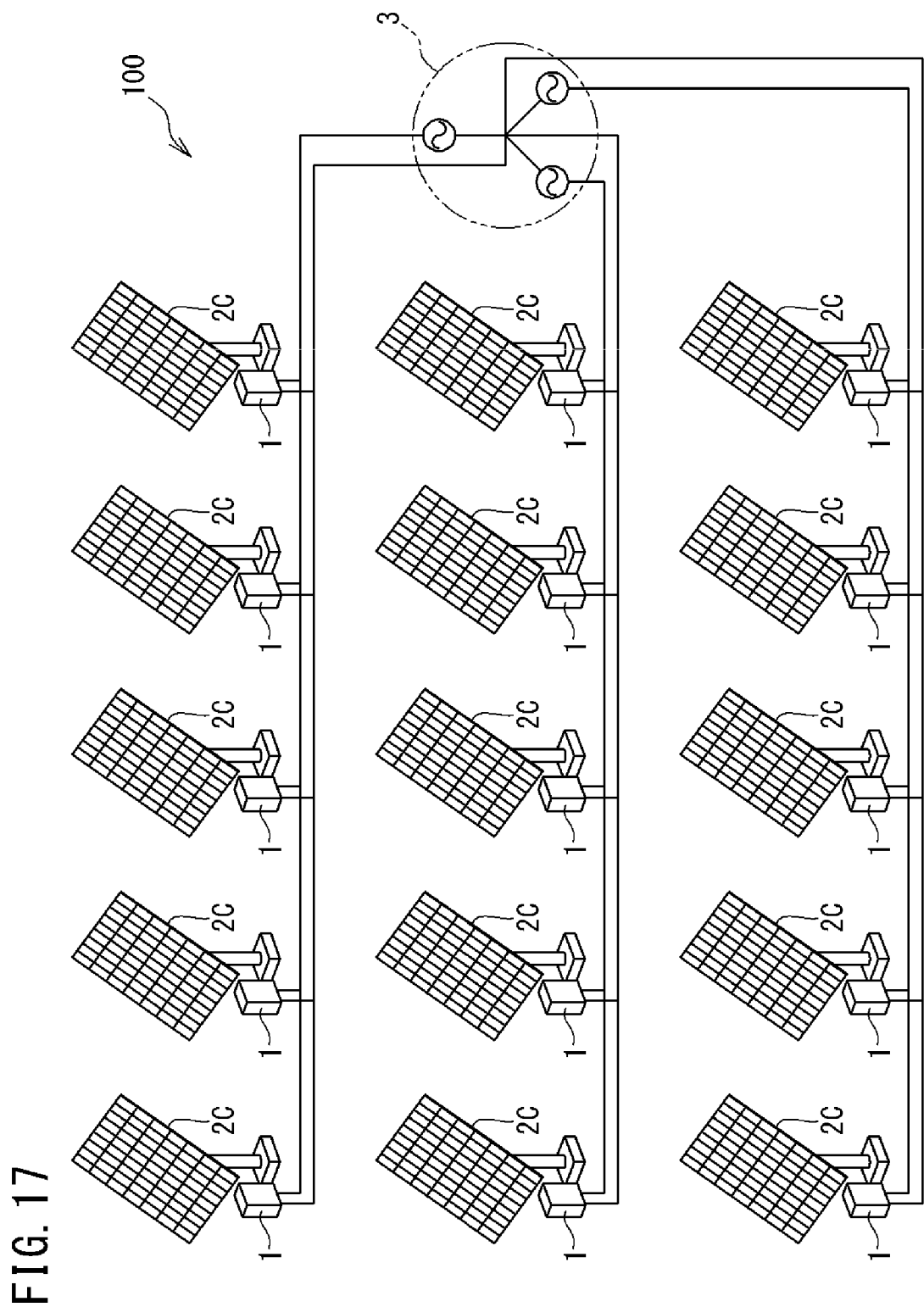
FIG. 17 is a schematic connection diagram showing a three-phase AC power supply device using a concentrator photovoltaic panel.

FIG. 17 is a schematic connection diagram showing the three-phase AC power supply device 100 using, for example, five concentrator photovoltaic (CPV) panels 2C for each phase, i.e., fifteen concentrator photovoltaic panels 2C in total. Each concentrator photovoltaic panel 2C has an optical system such as multiple Fresnel lenses arranged in matrix, to concentrate sunlight on the corresponding solar battery cell and generate power. In addition, each concentrator photovoltaic panel 2C has a tracking drive device (not shown) on the back side, and thus the concentrator photovoltaic panel 2C is configured to be always directed toward the sun during the day.

Each concentrator photovoltaic panel 2C is provided with the conversion device 1 (power conditioner). If outputs of the conversion devices 1 are connected in parallel in each phase to obtain large output of power generation and achieve system interconnection with the three-phase AC system 3, a photovoltaic power station can be obtained. Such a power station can perform comparatively stable power generation with high output during the day while suppressing power loss.

<<AC-to-DC Conversion Device>>

[Entire Configuration]

Next, an embodiment of a conversion device that performs power conversion from AC to DC will be described.

Figure 18:
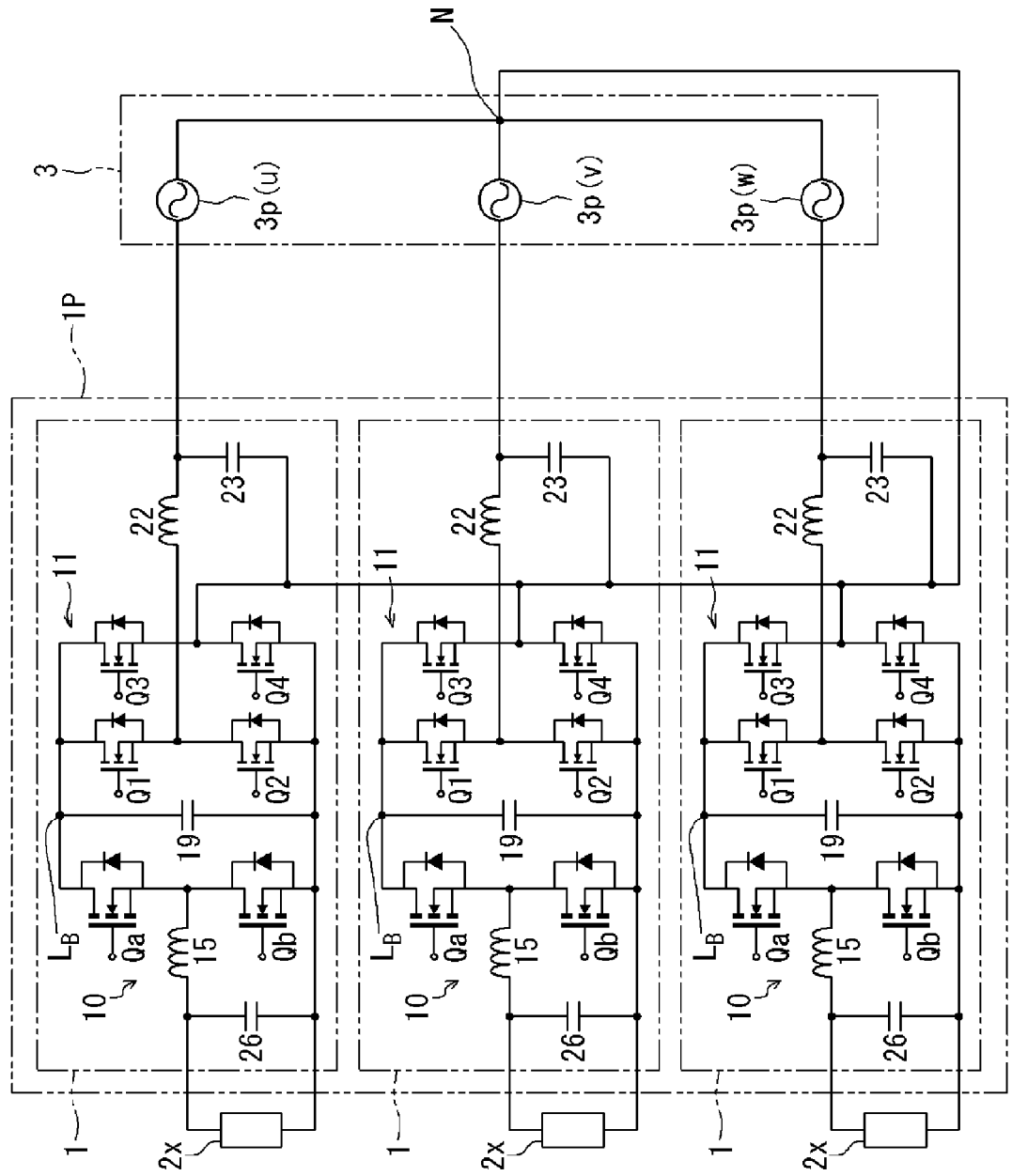
FIG. 18 is a circuit diagram showing power conversion devices connected to a three-phase AC system.

FIG. 18 is a circuit diagram showing the power conversion device 1P connected to the three-phase AC system 3. The power conversion device 1P is composed of three conversion devices (first-phase conversion device, second-phase conversion device, third-phase conversion device) 1 provided for the respective phases of the three-phase AC.

The conversion devices 1 receive the respective phase voltages with respect to the neutral point N of the three-phase AC system 3. A DC unit 2x is connected to the output end of each conversion device 1. This power conversion system can convert power provided from the three-phase AC system 3, from AC to DC, and supply the converted power to the DC unit 2x. The DC unit 2x is a DC power supply such as a storage battery, or a DC device that operates by DC current. The photovoltaic panel is also a kind of the DC unit 2x.

The three DC units 2x are in such a relationship as to be independent of each other without sharing either the positive terminals or the negative terminals.

The conversion device 1 includes: an AC/DC conversion circuit (single-phase power conversion circuit) 11 that converts AC power received from the three-phase AC system 3, to DC power; a step-down circuit (DC/DC conversion circuit) 10 that steps down output voltage of the AC/DC conversion circuit 11; the control unit 12 (not shown in FIG. 18) that controls operations of these circuits 10 and 11; the capacitors 19, 23, and 26; and the AC reactor 22. The circuit of the conversion device 1 is different from FIG. 1 in that FETs are used as the switching elements in the AC/DC conversion circuit 11, but the other configuration is the same.

Figure 19:
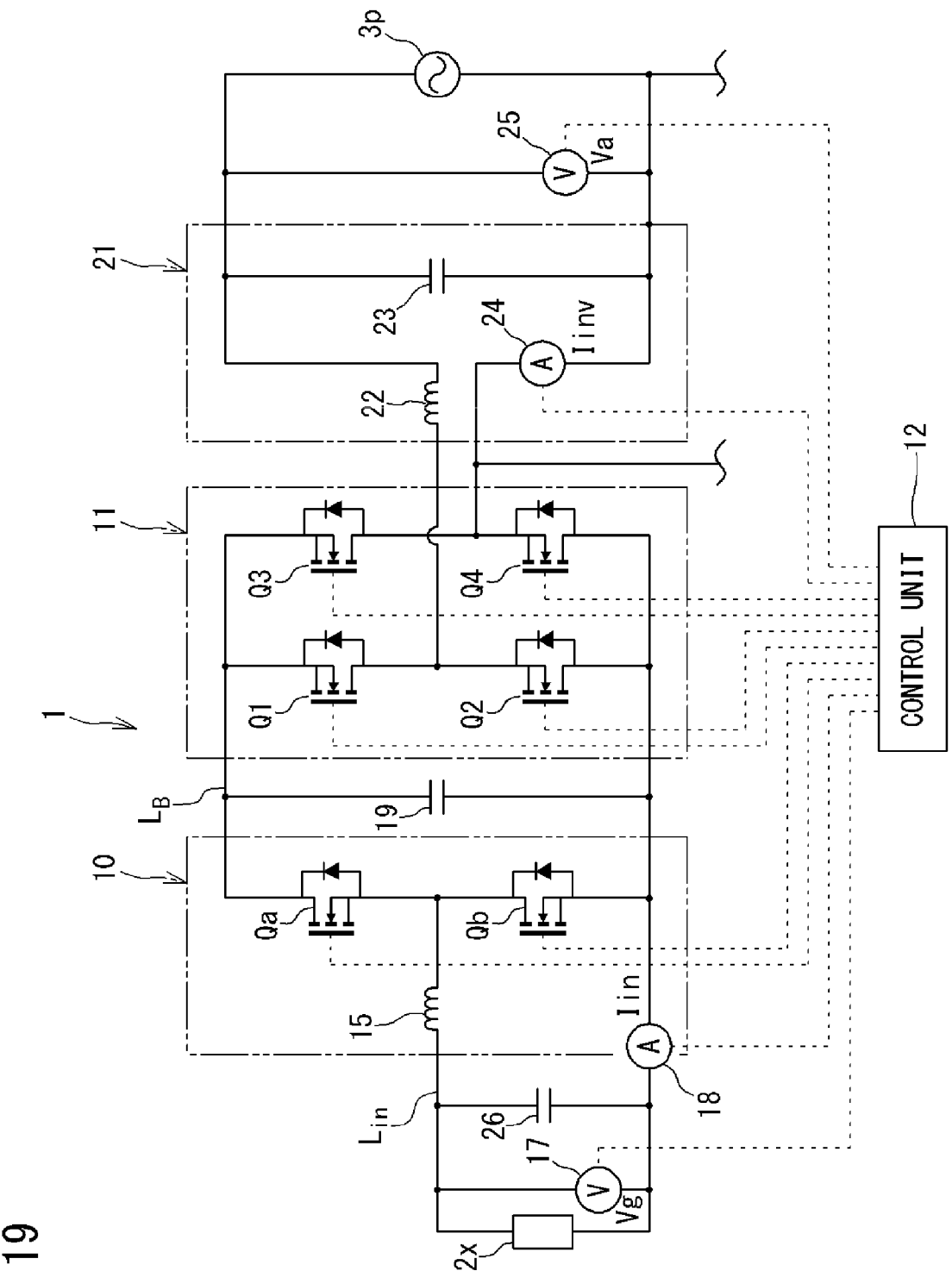
FIG. 19 is an example of a circuit diagram of each conversion device.

FIG. 19 is an example of a circuit diagram of the conversion device 1. A difference from FIG. 2 is that the photovoltaic panel 2 in FIG. 2 is replaced with a DC unit 2x, and FETs are used as the switching elements in the AC/DC conversion circuit 11. In terms of function, the step-up circuit 10 in FIG. 2 is replaced with the step-down circuit 10, and the circuit corresponding to the single-phase inverter circuit 11 in FIG. 2 is the AC/DC conversion circuit 11 that can also perform step-up operation in cooperation with the AC reactor 22 though the configuration of the switching elements is the same.

The other configuration of the conversion device 1 is basically the same as in FIG. 2. Therefore, the conversion device 1 in FIG. 19 has a bidirectional property, and is capable of performing the same operation as in the conversion device 1 in FIG. 2 when a photovoltaic panel is connected. If the DC unit 2x is a storage battery, it is possible to perform autonomous operation by converting the DC power to AC power.

Here, operation of the conversion device 1 in a case where the DC unit 2x is a storage battery will be described.

In a case of charging the storage battery based on AC power of the commercial AC system 3, the control unit 12 can perform synchronous rectification by controlling operations of the switching elements Q1 to Q4. In addition, by performing PWM control under the presence of the AC reactor 22, the control unit 12 can perform rectification while performing step-up operation. Thus, the AC/DC conversion circuit 11 converts AC power given from the commercial AC system 3 to DC power.

The step-down circuit 10 forms a step-down chopper circuit. The switching elements Qb and Qa are controlled by the control unit 12.

The switching operation of the step-down circuit 10 is controlled so that a period in which the step-down circuit 10 performs switching operation and a period in which the AC/DC conversion circuit 11 performs switching operation are alternately switched. Therefore, during a period in which the step-down circuit 10 performs switching operation, the step-down circuit 10 outputs stepped-down voltage to the storage battery, and during a period in which the step-down circuit 10 stops the switching operation (the switching element Qb is OFF and the switching element Qa is ON), the step-down circuit 10 gives DC voltage outputted from the AC/DC conversion circuit 11 and inputted to the step-down circuit 10, to the storage battery via the DC reactor 15.

[Summary of Voltage Waveform]

Figure 20:
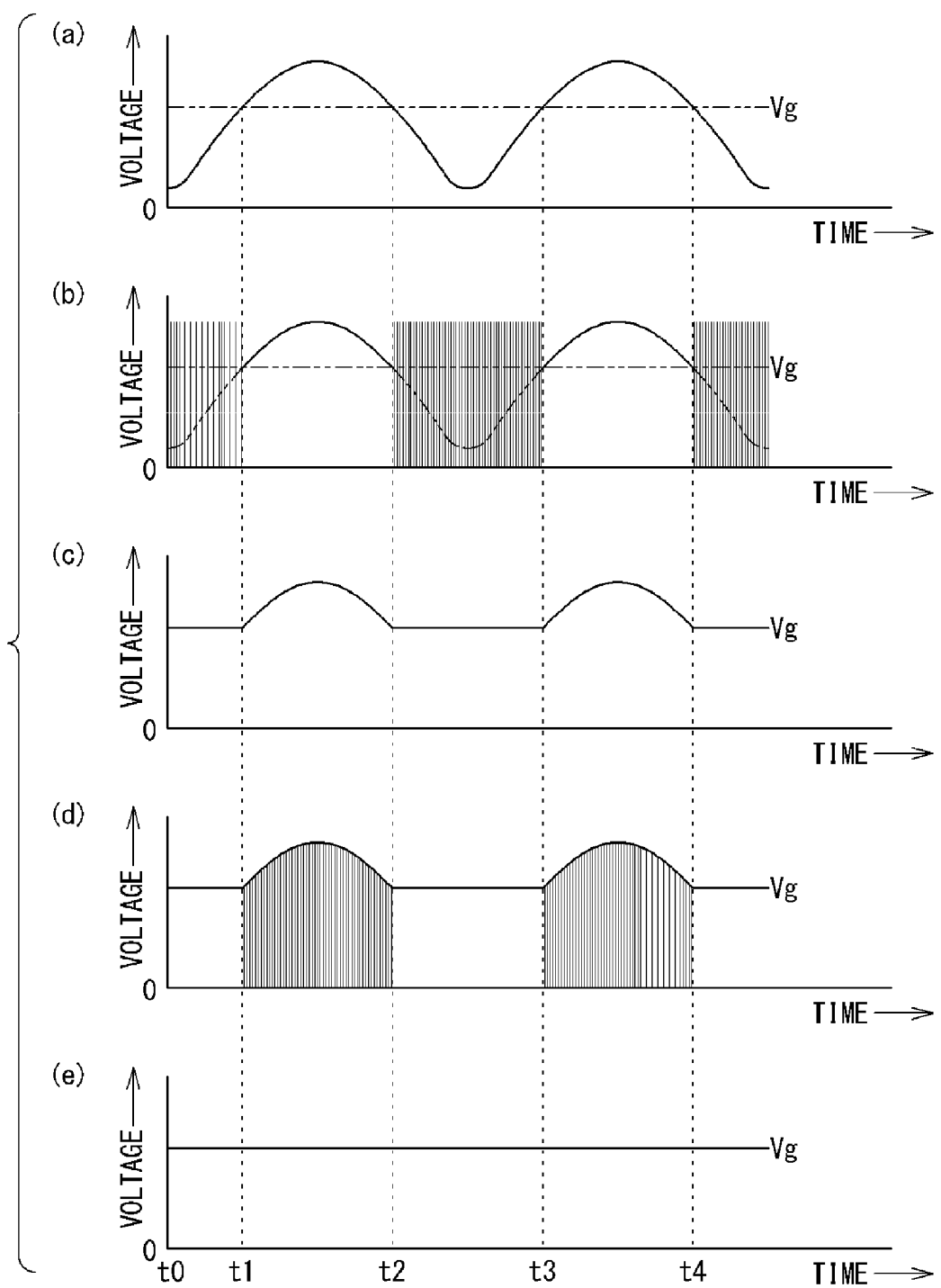
FIG. 20 is a voltage waveform diagram schematically showing operation of each conversion device.

FIG. 20 is a voltage waveform diagram conceptually showing operation of the conversion device 1.

In FIG. 20, (a) shows an example of an absolute value of an AC input voltage target value Vinv* for the AC/DC conversion circuit 11. This generally corresponds to a full-wave-rectified waveform based on the commercial AC. A two-dot dashed line indicates DC voltage Vg for charging. As shown in (b) of FIG. 20, during periods (from t0 to t1, from t2 to t3, from t4) in which the DC voltage Vg is higher than the absolute value of the AC input voltage target value Vinv*, the AC/DC conversion circuit 11 performs switching operation and performs step-up operation in cooperation with the AC reactor 22.

Meanwhile, during these periods (from t0 to t1, from t2 to t3, from t4), in the step-down circuit 10, the switching element Qb is OFF and the switching element Qa is ON, and the step-down circuit 10 stops step-down operation. It is noted that thin stripes shown in (b) of FIG. 20 are actually a PWM pulse train, and the duty thereof varies in accordance with the absolute value of the AC input voltage target value Vinv*. Therefore, if the voltage in this state is applied to the DC/DC conversion circuit, input voltage of the DC/DC conversion circuit, i.e., voltage of the capacitor 19 has a waveform as shown in (c) of FIG. 20.

On the other hand, during periods (from t1 to t2, from t3 to t4) in which the DC voltage Vg is lower than the absolute value of the AC input voltage target value Vinv*, the AC/DC conversion circuit 11 stops switching, and instead, the step-down circuit 10 operates. The switching mentioned here means high-frequency switching at about 20 kHz, for example, and does not mean switching at such a low frequency (twice as high as the commercial frequency) that is used for performing synchronous rectification. Even if the switching elements Q1 to Q4 are all OFF due to stop of switching in the AC/DC conversion circuit 11, voltage rectified through the diodes included in the switching elements Q1 to Q4 is inputted to the step-down circuit 10. Here, in order to reduce conduction loss, it is preferable to perform synchronous rectification.

In the AC/DC conversion circuit 11 in a case of performing synchronous rectification, through control by the control unit 12, during a period in which the sign of current in the AC/DC conversion circuit 11 is positive, the switching elements Q1 and Q4 are ON and the switching elements Q2 and Q3 are OFF, and during a period in which the sign of current in the AC/DC conversion circuit 11 is negative, ON and OFF of these switching elements are inverted. The frequency of the inversion is twice as high as the commercial frequency, and thus is very low as compared to the high-frequency switching frequency. Therefore, loss due to the ON/OFF inversion is extremely small.

Meanwhile, during the periods (from t1 to t2, from t3 to t4), the step-down circuit 10 performs step-down operation. Thin stripes shown in (d) of FIG. 20 are actually a PWM pulse train, and the duty thereof varies in accordance with the absolute value of the AC input voltage target value Vinv*. As a result of the step-down operation, desired DC voltage Vg shown in (e) of FIG. 20 is obtained.

As described above, only during a period in which the absolute value of the AC input voltage target value Vinv* based on AC voltage is lower than the DC voltage Vg, the AC/DC conversion circuit 11 operates, and during the other period, switching in the AC/DC conversion circuit 11 is stopped, whereby switching loss in the AC/DC conversion circuit 11 can be reduced.

Similarly, only during a period in which the absolute value of the AC input voltage target value Vinv* is higher than the DC voltage Vg, the step-down circuit 10 operates, and during the other period, switching in the step-down circuit 10 is stopped, whereby switching loss in the step-down circuit 10 can be reduced.

Thus, the AC/DC conversion circuit 11 and the step-down circuit 10 alternately perform switching operations, and when one of them operates, the other one stops switching. That is, for each of the AC/DC conversion circuit 11 and the step-down circuit 10, a period in which switching is stopped arises. In addition, since the AC/DC conversion circuit 11 operates in a region other than the peak of the absolute value of the AC input voltage target value Vinv* and the vicinity thereof, voltage at which the AC/DC conversion circuit 11 performs switching is relatively low. This also contributes to reduction in switching loss. Thus, switching loss in the conversion device 1 as a whole can be greatly reduced.

[Specifications of Control]

For control of the conversion device 1, the same concept can be applied as similar control obtained by reversing the direction of the control in system interconnection by the conversion device 1 in FIG. 2.

Various values in the conversion device 1, and various values in the conversion device 1 corresponding thereto are as follows.

Ia*: a target value for input current from the system phase power supply 3p
Iin: a step-down circuit current detection value
Iin*: a step-down circuit current target value
Iinv*: a target value for AC input current to the AC/DC conversion circuit 11
Ig*: a target value for DC input current to the storage battery
Ic: current flowing through the capacitor 19
Ica: current flowing through the capacitor 23
Va: a system voltage detection value
Vg: a storage battery voltage value
Vinv*: a target value for AC input voltage to the AC/DC conversion circuit 11
Vo*: a target value for input voltage to the step-down circuit 10
Pin: input power to the storage battery
$P_{LOSS}$: power loss in the conversion device 1
η: a power conversion efficiency in the conversion device 1

Therefore, it is possible to apply the following relationships corresponding to the aforementioned expressions (1) to (8) for the conversion device 1 in FIG. 2, etc.

An average value <Pin> of input power Pin to the storage battery, corresponding to expression (1), is represented as follows.

$$<Pin> = <Iin \times Vg> \tag{R1}$$

An average value <Ia*> of the target value for input current from the system phase power supply 3p, corresponding to expression (2), is represented as follows.

$$<Ia^*> = <Ig^* \times Vg>/(\eta \times <Va>) \tag{R2}$$

The input current target value Ia* corresponding to expression (3) is represented as follows.

$$Ia^* = (\sqrt{2}) \times <Ia^*> \times \sin \omega t \tag{R3}$$

The AC input current target value Iinv* corresponding to expression (4) is represented as follows.

$$Iinv^* = Ia^* - sCaVa \tag{R4}$$

The above expression (R4) is represented as follows, using a derivative with respect to time t.

$$Iinv^* = Ia^* - Ca \times (dVa/dt) \tag{R4a}$$

If current flowing through the capacitor 23 is detected and the detected current is denoted by Ica, the following expression is obtained.

$$Iinv^* = Ia^* - Ica \tag{R4b}$$

The AC input voltage target value Vinv* corresponding to expression (5) is represented as follows.

$$Vinv^* = Va - ZaIinv^* \tag{R5}$$

The above expression (R5) is represented as follows, using a derivative with respect to time t.

$$Vinv^* = Va - \{RaIinv^* + La \times (dIinv^*/dt)\} \tag{R5a}$$

As described above, the input target values (Iinv*, Vinv*) for the AC/DC conversion circuit 11 which are AC-side target values are set at a circuit connection point between the AC/DC conversion circuit 11 and the filter circuit 21. Therefore, as in a case of performing system interconnection, a point where the target values are set is moved to a stage (AC/DC conversion circuit 11 side) preceding to a circuit connection point between the system phase power supply 3p and the conversion device 1. By such, as it were, "reverse" system interconnection, appropriate interconnection between AC and DC is performed.

As for the input voltage target value Vo* for the step-down circuit 10 corresponding to expression (6), Vgf, i.e., (Vg−Z Iin) in expression (6) is replaced with Vgr, i.e., (Vg+Z Iin), to obtain the following expression.

$$Vo^*=\text{Max}(Vg+Z\ Iin, \text{absolute value of } Vinv^*) \quad (R6)$$

The above expression (R6) is represented as follows, using a derivative with respect to time t.

$$Vo^*=\text{Max}(Vg+RIin+L(dIin/dt), \text{absolute value of } Vinv^*) \quad (R6a)$$

The step-down circuit current target value Iin* is represented as follows.

$$Iin^*=\{(Iinv^* \times Vinv^*)-(sCVo^*) \times Vo^*\}/(Vg+ZIin) \quad (R7)$$

The above expression (R7) is represented as follows, using a derivative with respect to time t.

$$Iin^*=\{(Iinv^* \times Vinv^*)-C \times (dVo^*/dt) \times Vo^*\}/\{Vg+RIin+L(dIin/dt)\} \quad (R7a)$$

If current flowing through the capacitor 19 is detected and the detected current is denoted by Ic, the following expression is obtained.

$$Iin^*=\{(Iinv^* \times Vinv^*)-Ic \times Vo^*\}/(Vg+ZIin) \quad (R7b)$$

In expressions (R7), (R7a), and (R7b), a term added to a product of the AC input current target value Iinv* and the AC input voltage target value Vinv* is a value added in consideration of reactive power passing through the capacitor 19. That is, consideration of the reactive power in addition to the power target value for the AC/DC conversion circuit 11 allows for more accurate calculation of the value of Iin*.

Further, if power loss $P_{LOSS}$ of the conversion device 1 is measured in advance, the above expression (R7a) can be represented as follows.

$$Iin^*=\{(Iinv^* \times Vinv^*)-C \times (dVo^*/dt) \times Vo^* - P_{LOSS}\}/(Vg+ZIin) \quad (R7c)$$

Similarly, the above expression (R7b) can be represented as follows.

$$Iin^*=\{(Iinv^* \times Vinv^*)-Ic \times Vo^* - P_{LOSS}\}/(Vg+ZIin) \quad (R7d)$$

In this case, consideration of the reactive power and the power loss $P_{LOSS}$ in addition to the power target value of the AC/DC conversion circuit 11 allows for more strict calculation of the value of Iin*.

If the electrostatic capacitance C and the power loss $P_{LOSS}$ of the capacitor 19 are sufficiently smaller than (Iinv*× Vinv*), the following expression (R8) is obtained. Iin* calculated by this expression (R8) can be used as Iin contained in the right-hand sides of expressions (R6), (R6a), (R7), (R7a), (R7b), (R7c), and (R7d).

$$Iin^*=(Iinv^* \times Vinv^*)/Vg \quad (R8)$$

As described above, the control unit 12 performs control so that the step-down circuit 10 is operated in a case of outputting voltage corresponding to the part where the absolute value of the AC input voltage target value Vinv* for the AC/DC conversion circuit 11 is higher than the DC voltage (Vg+Z Iin), and the AC/DC conversion circuit 11 is operated in a case of outputting voltage corresponding to the part where the absolute value of the AC input voltage target value Vinv* for the AC/DC conversion circuit 11 is lower than the DC voltage (Vg+Z Iin). Therefore, a potential difference in stepping up by the AC/DC conversion circuit 11 can be reduced, and loss due to switching of the AC/DC conversion circuit 11 and the step-down circuit 10 is reduced, whereby DC power can be outputted with increased efficiency.

Further, since both the step-down circuit 10 and the AC/DC conversion circuit 11 operate based on the target values set by the control unit 12, occurrence of phase-deviation or distortion in AC current inputted to the AC/DC conversion circuit 11 can be suppressed even if operation is performed so as to alternately switch the high-frequency switching period between the two circuits.

In addition, as described above, the conversion device 1 can perform the same system interconnection operation as in the conversion device 1 in FIG. 2, etc. Therefore, it is possible to realize an efficient conversion device that can be used in both directions of DC/AC conversion to perform system interconnection, and AC/DC conversion.

In the above description, the DC unit 2x has been assumed to be a storage battery. However, the same control is performed even when the storage battery is replaced with a DC device.

[Others]

In FIG. 18 and FIG. 19, an example in which FETs are used as the switching elements composing the AC/DC conversion circuit 11 has been shown. However, instead of FETs, IGBTs may be used. In a case of IGBTs, synchronous rectification cannot be performed. Therefore, in a case of IGBTs, when high-frequency switching of the AC/DC conversion circuit 11 is stopped, the AC/DC conversion circuit 11 operates as a full-bridge rectification circuit by means of the diodes included in the elements.

In addition, since the conversion device 1 in FIG. 19 can be used in both the direction from DC to AC and the direction from AC to DC, plural kinds of DC units 2x may be prepared and connected in a switched manner. For example, during the day, a photovoltaic panel may be connected as the DC unit 2x to perform system interconnection and sell power, and during the night, a storage battery or a DC device may be connected as the DC unit 2x.

<<Other Variations>>

[Common DC Unit and Isolation Transformer]

In FIG. 18, an example in which three DC units 2x are independent of each other has been shown. In this case, the electric specifications of the DC units 2x may be different from each other. For example, three DC units 2x having voltages different from each other may be used. On the other hand, the DC units may be integrated into one unit so as to be common among the conversion devices 1 for the respective phases.

Figure 21:
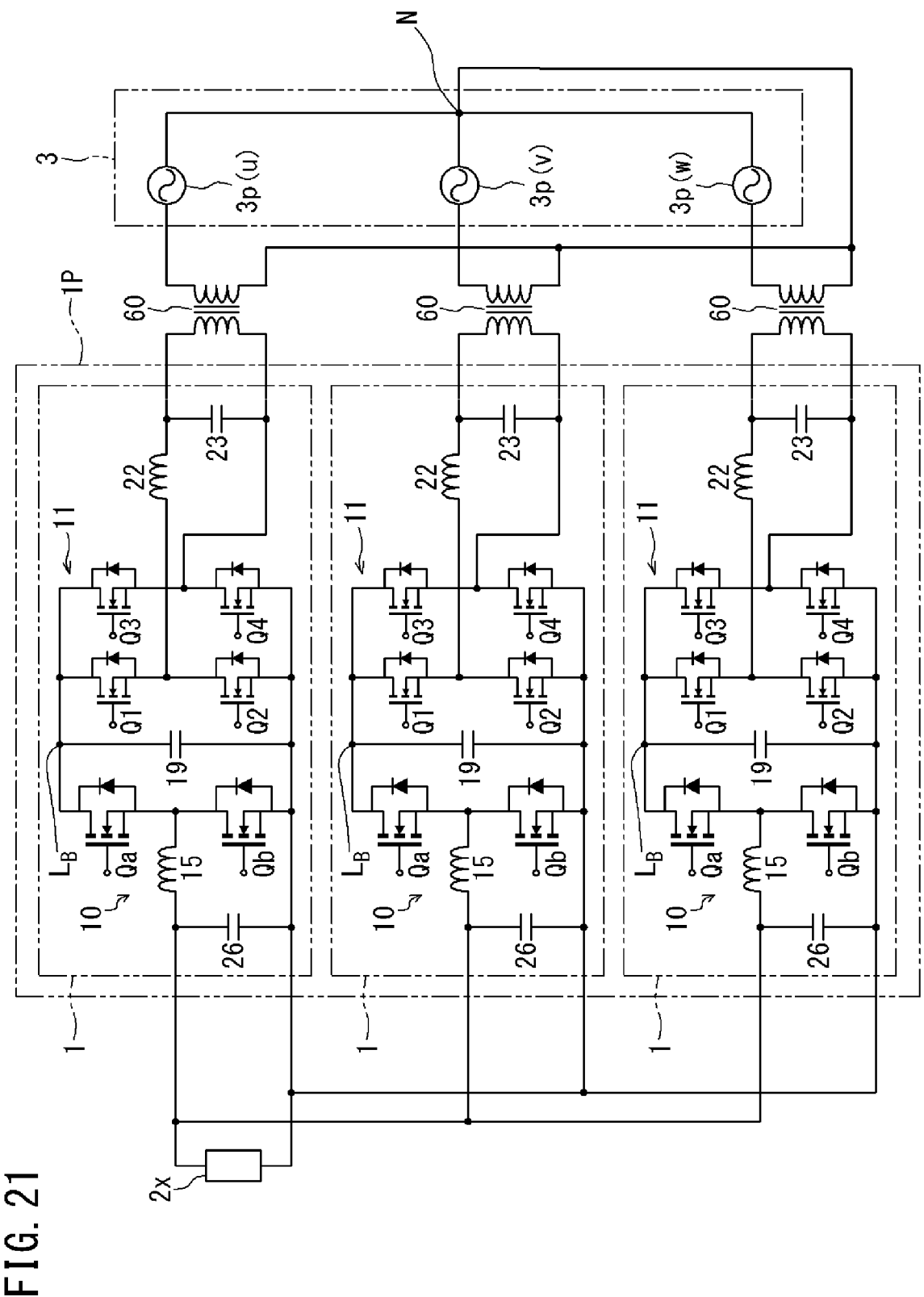
FIG. 21 is a circuit diagram in a case of providing a common DC unit.

FIG. 21 is a circuit diagram in a case of using such a common DC unit 2x. In this case, isolation transformers 60 are provided between the power conversion device 1P and the three-phase AC system 3. Although the isolation transformers 60 are needed, there is an advantage that the DC units 2x can be integrated into one unit. Thus, for example, in a case where the DC unit 2x is a storage battery, the capacity thereof can be set to an appropriate value without waste.

[Three Independent DC Units+Three-Phase Three-Line Connection]

In FIG. 18, an example of three-phase four-line connection with a neutral point (the three-phase AC system is Y-connected) has been shown. However, three-phase three-line connection (the three-phase AC system is delta-connected) without a neutral point may be used.

Figure 22:
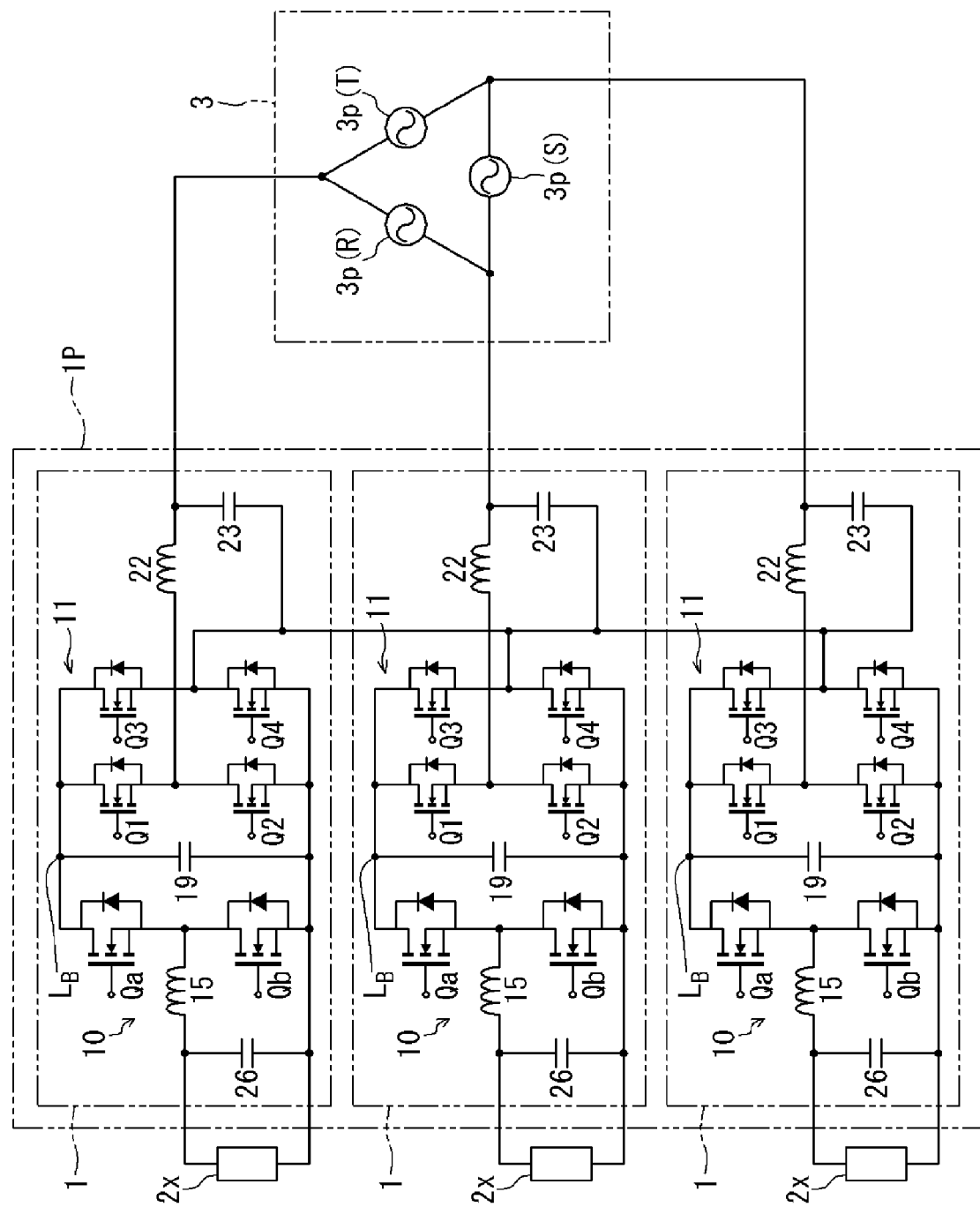
FIG. 22 is a circuit diagram in a case of using three-phase three-line connection.

FIG. 22 is a circuit diagram in a case of such three-phase three-line connection. In this case, outputs of three conversion devices 1 are connected to system line-to-line power supplies 3p(R), 3p(S), and 3p(T) of the delta-connected three-phase AC system 3. In this case, the withstand voltage property required on the conversion device 1 side relatively increases as compared to a case of three-phase four-line connection, but if, for example, the voltage of the three-phase AC system 3 is 200V, this circuit configuration can be employed without any particular problems.

[Common DC Unit+Isolation Transformers+Three-Phase Three-Line Connection]

Figure 23:
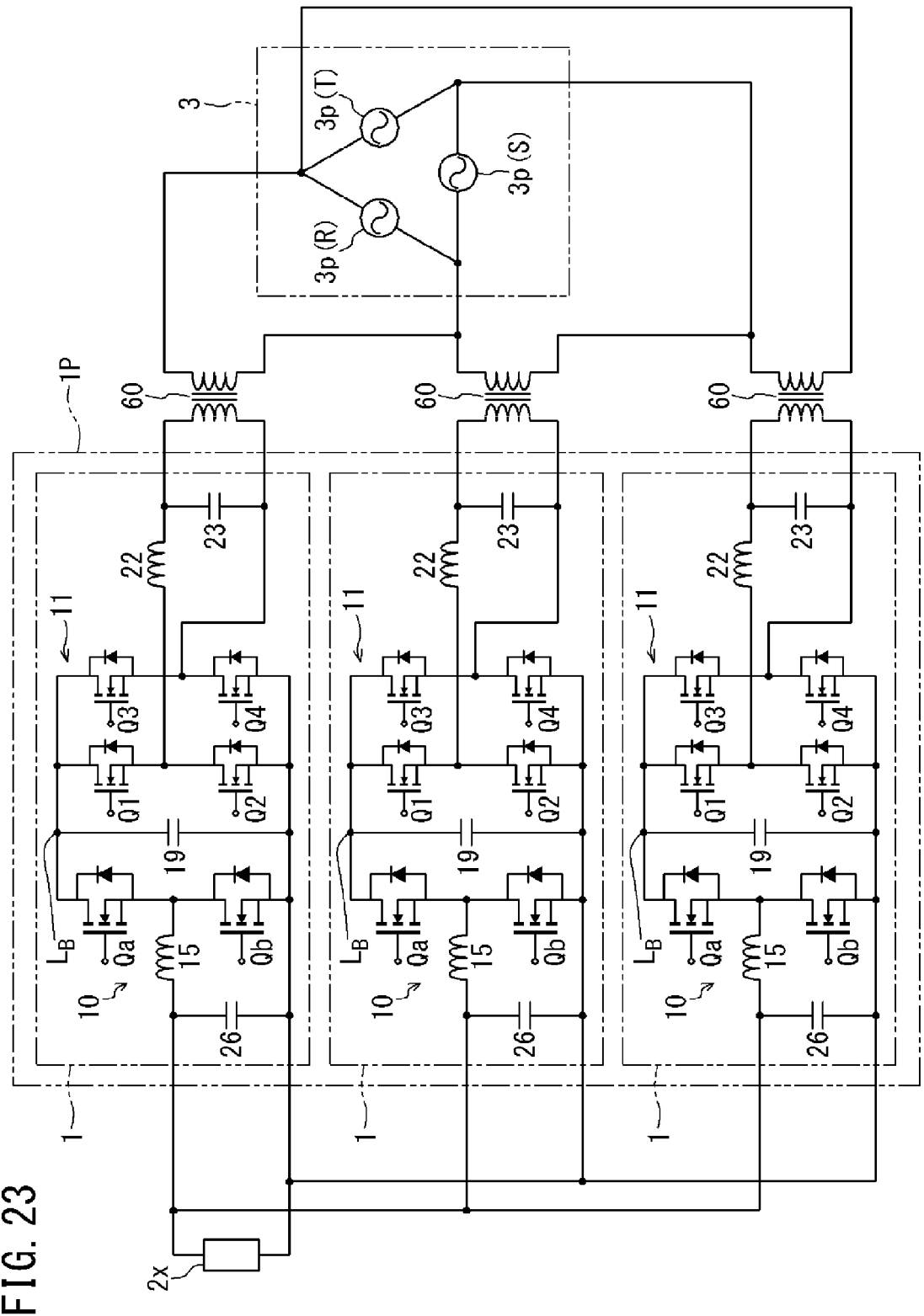
FIG. 23 is a circuit diagram in which a common DC unit is provided, isolation transformers are provided, and three-phase three-line connection is used.
Figure 24:
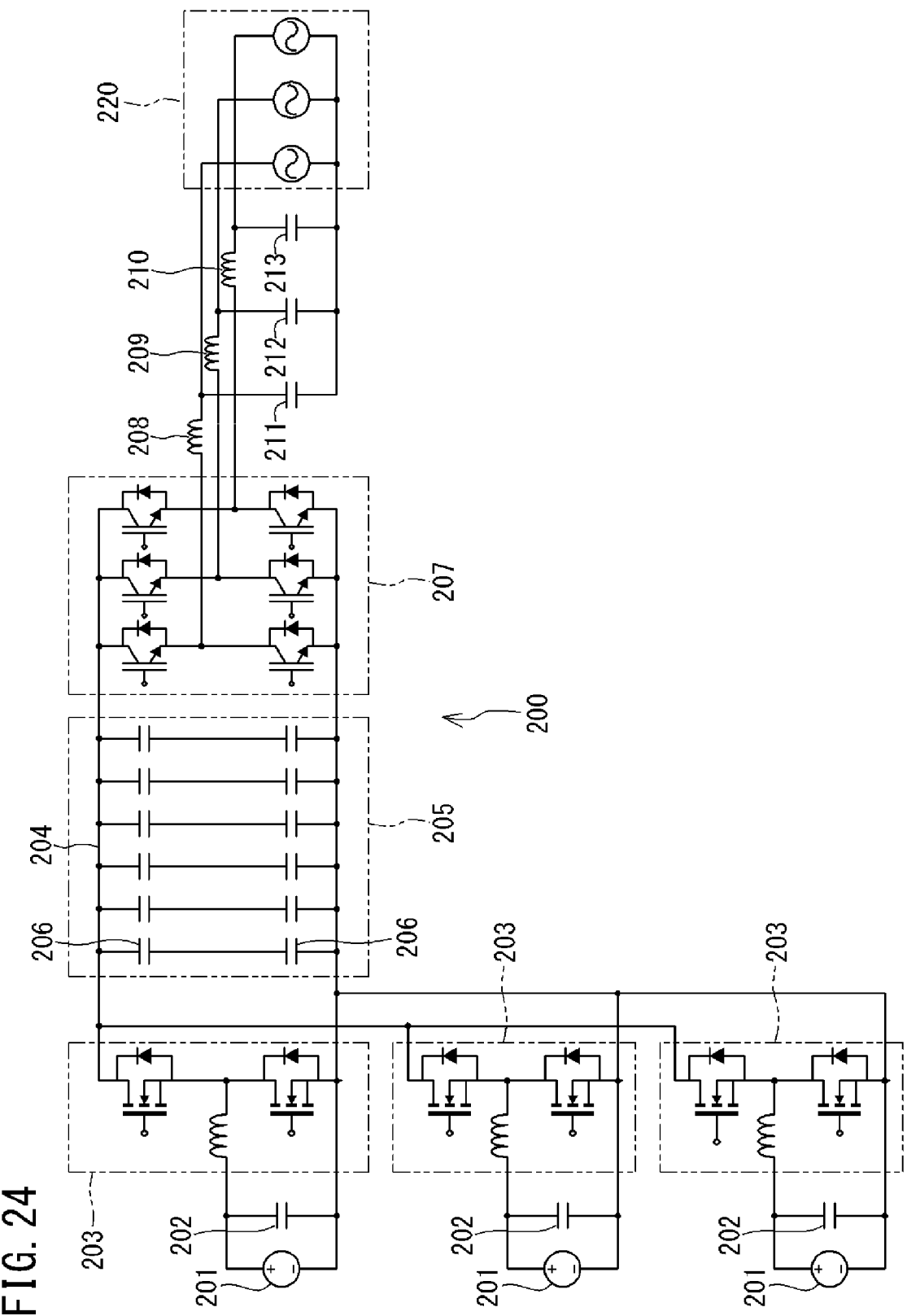
FIG. 24 is an example of a circuit diagram of a conventional power conversion device used in a case of performing system interconnection from a DC power supply to a three-phase AC system.

FIG. 23 is a circuit diagram in which a common DC unit 2x is provided, isolation transformers 60 are provided, and three-phase three-line connection is used.

<<Supplement>>

It is noted that the embodiments disclosed herein are merely illustrative in all aspects and should not be recognized as being restrictive. The scope of the present invention is defined by the scope of the claims and is intended to include meaning equivalent to the scope of the claims and all modifications within the scope.

REFERENCE SIGNS LIST 1 conversion device
1P power conversion device
2 photovoltaic panel (DC power supply)
2x DC unit
2C concentrator photovoltaic panel
3 three-phase AC system
3p system phase power supply, system line-to-line power supply
10 step-up circuit, step-down circuit (DC/DC conversion circuit)
11 single-phase inverter circuit, AC/DC conversion circuit (single-phase power conversion circuit)
12 control unit
15 DC reactor
17 voltage sensor
18 current sensor
19 capacitor
21 filter circuit
22 AC reactor
23 capacitor
24 current sensor
25 voltage sensor
26 capacitor
30 control processing unit
32 circuit control unit
33 circuit control unit
34 averaging processing unit
41 first calculation section
42 first adder
43 compensator
44 second adder
51 second calculation section
52 third adder
53 compensator
54 fourth adder
60 isolation transformer
100 three-phase AC power supply device
$L_B$ DC bus
$L_{in}$ electric path
Q1 to Q4, Qa, Qb switching element

The invention claimed is:

1. A power conversion device that converts power between a DC unit and a three-phase AC, the power conversion device comprising:

a first-phase conversion device configured to covert power between the DC unit and a first phase of the three-phase AC, via a first reactor;

a second-phase conversion device configured to covert power between the DC unit and a second phase of the three-phase AC, via a second reactor;

a third-phase conversion device configured to covert power between the DC unit and a third phase of the three-phase AC, via a third reactor; and a control unit configured to control the first-phase conversion device, the second-phase conversion device, and the third-phase conversion device, wherein the first-phase conversion device, the second-phase conversion device, and the third-phase conversion device each include a DC/DC conversion circuit and a single-phase power conversion circuit, and for each of the first-phase conversion device, the second-phase conversion device, and the third-phase conversion device, when an absolute value of a voltage target value for the AC exceeds DC voltage of each DC unit, the control unit causes the DC/DC conversion circuit to operate to achieve the absolute value of the voltage target value and causes the single-phase power conversion circuit to only perform necessary polarity inversion, and when the absolute value of the voltage target value is smaller than the DC voltage, the control unit stops operation of the DC/DC conversion circuit and causes the single-phase power conversion circuit to operate to achieve the voltage target value.

2. The power conversion device according to claim 1, wherein an output smoothing capacitor is provided at each of stages subsequent to the first reactor, the second reactor, and the third reactor, a smoothing capacitor is provided between the DC/DC conversion circuit and the single-phase power conversion circuit, and for each of the first-phase conversion device, the second-phase conversion device, and the third-phase conversion device, the control unit controls output of the AC power based on: an output current target value obtained based on a value of input power from the corresponding DC unit and a value of phase voltage of the three-phase AC; and a current target value for the corresponding DC/DC conversion circuit calculated from the following expression representing the current target value Iin* for the DC/DC conversion circuit:

$$Iin^* = \{(Iinv^* \times Vinv^*) + (sCVo^*) \times Vo^*\}/V_{DC},$$

the current target value Iinv* for the single-phase power conversion circuit being represented as follows:

$$Iinv^* = Ia^* + sCaVa,$$

where
Ia* is the output current target value,
Vinv* is a voltage target value for the single-phase power conversion circuit,
Ca is an electrostatic capacitance of the output smoothing capacitor,
Va is a voltage value of phase voltage of the three-phase AC,
C is an electrostatic capacitance of the smoothing capacitor provided between the DC/DC conversion circuit and the single-phase power conversion circuit,
Vo* is a voltage target value for the DC/DC conversion circuit, $V_{DC}$ is a DC input voltage value, s is a Laplace operator.

3. The power conversion device according to claim 2, wherein the control unit calculates the voltage target value Vinv* for the single-phase power conversion circuit as the voltage target value for the DC/DC conversion circuit by the following expression:

$$Vinv^* = Va + sLaIinv^*,$$

where La is an inductance that is common among the first reactor, the second reactor, and the third reactor.

4. The power conversion device according to claim 1, wherein the DC unit is composed of a first DC unit, a second DC unit, and a third DC unit provided for the first phase, the second phase, and the third phase, respectively, the DC units being independent of each other without sharing either positive terminals or negative terminals.

5. The power conversion device according to claim 1, wherein the DC unit is one unit that is common among the first phase, the second phase, and the third phase, and isolation transformers are provided between: the first-phase conversion device, the second-phase conversion device, and the third-phase conversion device; and the respective phases of the three-phase AC.

6. The power conversion device according to claim 1, wherein the power conversion device is connected to the three-phase AC in either connection manner of three-phase four-line connection or three-phase three-line connection.

7. A three-phase AC power supply device comprising:

a DC power supply;

a first-phase conversion device configured to supply AC power via a first reactor to a first phase of the three-phase AC, based on DC power inputted from the DC power supply;

a second-phase conversion device configured to supply AC power via a second reactor to a second phase of the three-phase AC, based on DC power inputted from the DC power supply;

a third-phase conversion device configured to supply AC power via a third reactor to a third phase of the three-phase AC, based on DC power inputted from the DC power supply; and a control unit configured to control the first-phase conversion device, the second-phase conversion device, and the third-phase conversion device, wherein the first-phase conversion device, the second-phase conversion device, and the third-phase conversion device each include a DC/DC conversion circuit and a single-phase power conversion circuit, and for each of the first-phase conversion device, the second-phase conversion device, and the third-phase conversion device, when an absolute value of a voltage target value for the AC to be outputted exceeds inputted DC voltage, the control unit causes the DC/DC conversion circuit to operate to generate the absolute value of the voltage target value and causes the single-phase power conversion circuit to only perform necessary polarity inversion, and when the absolute value of the voltage target value is smaller than the inputted DC voltage, the control unit stops operation of the DC/DC conversion circuit and causes the single-phase power conversion circuit to operate to generate the voltage target value.

8. The three-phase AC power supply device according to claim 7, wherein the DC power supply is composed of a first DC power supply, a second DC power supply, and a third DC power supply provided for the first phase, the second phase, and the third phase, respectively, the DC power supplies being independent of each other without sharing either positive terminals or negative terminals.

9. The three-phase AC power supply device according to claim 7, wherein the DC power supply is one power supply that is common among the first phase, the second phase, and the third phase, and isolation transformers are provided between: the first-phase conversion device, the second-phase conversion device, and the third-phase conversion device; and the respective phases of the three-phase AC.

10. The three-phase AC power supply device according to claim 7, wherein the first-phase conversion device, the second-phase conversion device, and the third-phase conversion device are connected to the three-phase AC in either connection manner of three-phase four-line connection or three-phase three-line connection.

11. The three-phase AC power supply device according to claim 7, wherein each of the first DC power supply, the second DC power supply, and the third DC power supply is a concentrator photovoltaic panel configured to operate so as to track the sun.

12. The three-phase AC power supply device according to claim 7, wherein the three-phase AC power supply device is system-interconnected with the three-phase AC system.

13. The three-phase AC power supply device according to claim 7, wherein the three-phase AC power supply device is configured to output the three-phase AC by autonomous operation.

14. The power conversion device according to claim 2, wherein the DC unit is composed of a first DC unit, a second DC unit, and a third DC unit provided for the first phase, the second phase, and the third phase, respectively, the DC units being independent of each other without sharing either positive terminals or negative terminals.

15. The power conversion device according to claim 3, wherein the DC unit is composed of a first DC unit, a second DC unit, and a third DC unit provided for the first phase, the second phase, and the third phase, respectively, the DC units being independent of each other without sharing either positive terminals or negative terminals.

16. The power conversion device according to claim 2, wherein the DC unit is one unit that is common among the first phase, the second phase, and the third phase, and isolation transformers are provided between: the first-phase conversion device, the second-phase conversion device, and the third-phase conversion device; and the respective phases of the three-phase AC.

17. The power conversion device according to claim 3, wherein the DC unit is one unit that is common among the first phase, the second phase, and the third phase, and isolation transformers are provided between: the first-phase conversion device, the second-phase conversion device, and the third-phase conversion device; and the respective phases of the three-phase AC.

18. The power conversion device according to claim 2, wherein the power conversion device is connected to the three-phase AC in either connection manner of three-phase four-line connection or three-phase three-line connection.

19. The power conversion device according to claim 3, wherein the power conversion device is connected to the three-phase AC in either connection manner of three-phase four-line connection or three-phase three-line connection.

* * * * *